(12) United States Patent
Burhorst et al.

(10) Patent No.: US 12,390,814 B2
(45) Date of Patent: Aug. 19, 2025

(54) DUAL-SHAFT SHREDDER WITH A HORIZONTAL MAINTENANCE CONCEPT

(71) Applicant: VOGELSANG GMBH & CO. KG, Essen (DE)

(72) Inventors: Torsten Burhorst, Essen/Oldb. (DE); Stephen Tapken, Essen/Oldb. (DE)

(73) Assignee: VOGELSANG GMBH & CO KG, Essen (DE)

( * ) Notice: Subject to any disclaimer, the term of this patent is extended or adjusted under 35 U.S.C. 154(b) by 224 days.

(21) Appl. No.: 18/007,518

(22) PCT Filed: Jun. 2, 2021

(86) PCT No.: PCT/EP2021/064758
§ 371 (c)(1),
(2) Date: Dec. 1, 2022

(87) PCT Pub. No.: WO2021/245124
PCT Pub. Date: Dec. 9, 2021

(65) Prior Publication Data
US 2023/0234070 A1    Jul. 27, 2023

(30) Foreign Application Priority Data
Jun. 3, 2020 (DE) .................. 20 2020 103 188.0

(51) Int. Cl.
*B02C 18/14* (2006.01)
*B02C 18/16* (2006.01)
*B02C 18/24* (2006.01)

(52) U.S. Cl.
CPC ............ *B02C 18/142* (2013.01); *B02C 18/24* (2013.01); *B02C 2018/162* (2013.01)

(58) Field of Classification Search
CPC ... B02C 18/06; B02C 18/0007; B02C 18/142; B02C 18/146; B02C 18/2233; B02C 18/2225; B02C 2018/162
(Continued)

(56) References Cited

U.S. PATENT DOCUMENTS 4,385,732 A * 5/1983 Williams ............ B02C 18/0084
241/73
4,718,614 A * 1/1988 Hausler ................ B02C 13/282
241/189.1
(Continued)

FOREIGN PATENT DOCUMENTS

CN   205659758   10/2016
DE   4315671     11/1994
(Continued)

*Primary Examiner* — Bobby Yeonjin Kim
(74) *Attorney, Agent, or Firm* — PRICE HENEVELD LLP

(57) ABSTRACT

A two-shaft shredder includes a shredder housing, a first cutter disc unit, and a second cutter disc unit. The first cutter disc unit has at a first axial end a first bearing unit with a first bearing housing and at a second axial end a second bearing unit with a second bearing housing. A first cutter disc block is rotatably mounted about a first axis of rotation. The second cutter disc unit has at a first axial end a third bearing unit with a third bearing housing and at a second axial end a fourth bearing unit with a fourth bearing housings. A second cutter disc block is rotatably mounted about a second axis of rotation. The shredder housing has a first maintenance hatch cover which, in a release position, permits removal of the first cutter disc unit together with the first and second bearing units.

22 Claims, 11 Drawing Sheets

(58) Field of Classification Search
USPC .......................... 241/236, 285.2, 285.3, 224
See application file for complete search history.

(56) References Cited

U.S. PATENT DOCUMENTS

| | | | | |
|---|---|---|---|---|
| 5,562,257 | A * | 10/1996 | Graveman | ............... B02C 13/20 |
| | | | | 241/243 |
| 5,580,009 | A | 12/1996 | Kennedy | |
| 11,192,115 | B2 * | 12/2021 | Lindner | ................... B02C 18/24 |
| 11,819,856 | B2 * | 11/2023 | McCall | ................. B02C 18/145 |
| 2002/0148917 | A1 | 10/2002 | Koenig | |
| 2008/0197221 | A1 * | 8/2008 | Hartnett | ............... B02C 18/0007 |
| | | | | 241/83 |
| 2014/0103152 | A1 | 4/2014 | Van der Galien | |
| 2015/0060583 | A1 * | 3/2015 | Boehlefeld | ......... B02C 18/2291 |
| | | | | 241/224 |

FOREIGN PATENT DOCUMENTS

| | | |
|---|---|---|
| DE | 102007049028 | 4/2009 |
| DE | 202010005584 | 11/2011 |
| DE | 202010010662 | 11/2011 |
| DE | 202012007418 | 11/2013 |
| DE | 102012216914 | 3/2014 |
| EP | 1442796 | 8/2004 |
| EP | 2662143 | 11/2013 |
| EP | 2736645 | 6/2014 |
| EP | 2846918 | 3/2015 |
| EP | 3248687 | 11/2017 |
| EP | 3453460 | 3/2019 |
| EP | 3566777 | 11/2019 |
| WO | 2017202842 | 11/2017 |
| WO | 2018087398 | 5/2018 |
| WO | 2019215312 | 11/2019 |

\* cited by examiner

DUAL-SHAFT SHREDDER WITH A HORIZONTAL MAINTENANCE CONCEPT

CROSS-REFERENCE TO FOREIGN PRIORITY APPLICATION

The present application claims the benefit under 35 U.S.C. §§ 119(b), 119(e), 120, and/or 365(c) of PCT/EP2021/064758 filed Jun. 2, 2021, which claims priority to German Application No. 20 2020 103 188.0 filed Jun. 3, 2020.

FIELD OF THE INVENTION

The invention relates to a two-shaft shredder for shredding solids or solids in liquids, comprising: a shredder housing defining an interior shredding space, an inlet opening in the shredder housing for feeding solids into the shredding space, an outlet opening in the shredder housing substantially opposite the inlet opening for discharging shredded solids from the shredding space, a first cutter disc unit comprising a first cutter disc block having a plurality of first cutter discs arranged on a first hub body such that a space is provided between each two adjacent first cutter discs, and a second cutter disc unit comprising a second cutter disc block having a plurality of second cutter discs arranged on a second hub body such that there is a space between each two adjacent second cutter discs, wherein the first and second cutter disc blocks are axially offset from each other with their axes of rotation such that at least some of the first cutter discs respectively engage a space between two adjacent second cutter discs, and some of the second cutter discs respectively engage a space between two adjacent first cutter discs.

BACKGROUND OF THE INVENTION

Two-shaft or twin-shaft shredders of this design are used to shred solids, for example, organic materials such as animal carcasses, branches, twigs, plants, or other materials such as plastic waste or recycling material in general. The solids to be shredded can be fed to the two-shaft shredder through the inlet opening in dry form or in a liquid stream.

For the purpose of effective shredding, two-shaft shredders have two-shafts, on each of which a plurality of cutter discs are arranged and which are referred to as cutter disc blocks. The cutter discs engage with each other reciprocally, which is made possible and achieved by the fact that between two adjacent cutter discs of one cutter disc block there is an axial distance which is greater than the thickness of a cutter disc of the other cutter disc block and the axial distance of the two cutter disc blocks from each other is smaller than the diameter of a cutter disc.

The two cutter disc blocks of a two-shaft shredder are typically driven in opposite directions and coupled to each other for this purpose, for example, via a corresponding gearbox. A good shredding result is achieved in particular when the two cutter disc blocks rotate at different speeds. In this way, high shear forces and tearing forces are caused by the counter-rotating cutter discs in the space between the two cutter disc blocks, resulting in effective comminution of the solids. In addition, different rotational speeds cause other cutter segments of adjacent cutter discs to engage with each other with each revolution, whereby the cutter discs are automatically cleaned of adhering comminution material.

A disadvantage of two-shaft shredders of this design is that, due to the type of the relative movement of the two-shafts having the cutter discs arranged on them, cutter discs can be damaged if a hard, solid body enters the shredding chamber and is jammed between two cutter discs or between a cutter disc and the opposite shaft. This can seriously damage cutter discs in the area of their cutting edges, making further operation of the two-shaft shredder impossible or resulting in only low shredding efficiency. Likewise, depending on the type and quantity of materials to be shredded, wear can occur on the cutter discs.

For this reason, it is known to equip two-shaft shredders with a quick-change system in which the blades can be pulled off the shafts in order to replace such damaged blades. This ensures that the functionality of the two-shaft shredder can be restored with low maintenance effort.

Another system, known from WO 2018 087 398, uses monolithic cutter disc blocks in which the individual blades are integrally connected to the shaft or hub. Shaft journals are then inserted at axial ends so that the cutter disc block as a whole can be replaced easily and quickly. Monolithic cutter disc blocks are known from DE 20 2010 010 662 U1.

A two-shaft shredder with quick-change device is known from EP 3 248 687. Here it is provided that the two cutter shafts each have an axial recess on one side and a shaft journal on the other side, so that they can be removed through the inlet opening after certain end face parts have been loosened. In particular, the entire engine block is removed from the end face. This bears a not inconsiderable effort, since, in particular, an infeed funnel or the like must also be removed in order to be able to replace the cutter shafts.

DE 20 2012 007 418 U1 discloses a shredding device in which individual blades can be replaced through a lateral flap that can be opened about a vertical axis in the manner of a door. For this purpose, the blades are arranged on the shaft in such a way that they can be easily replaced. However, no rotating blades are provided. This concept thus is not applicable to cutter disc shafts or cutter disc blocks as described above.

Another two-shaft shredder is known from U.S. Pat. No. 5,580,009 B1. The two-shaft shredder disclosed therein is driven via a motor and a gearbox so that the two cutter shafts rotate in opposite directions with a fixed speed ratio. The shafts are connected to respective bearing or drive units via shaft connectors, and the shaft connectors can be separated. On the sides of a shredder housing, wall elements can be removed in order to be able to replace the cutter shafts. A disadvantage here is, in particular, the shaft connection, which entails certain strength disadvantages.

Furthermore, EP 2 846 918 B1 discloses a maintenance-friendly two-shaft shredder in which the hopper together with a part of the cutter shaft bearing can be opened so that the cutter shafts are accessible from above. The cutter shafts can then be released by detaching special bearing plates from the housing. The cutter shafts can then be removed in an upwards direction and replaced with new or different cutter shafts. The feed hopper and bearing houses are then closed again. The disadvantage of this is that the feed hopper has to pivot away. For this reason, the two-shaft shredder disclosed in this document is not suitable for installations in which, for example, a pipeline is provided instead of a feed hopper, or for two-shaft shredders in which the feed hopper is fixed in some other way and cannot be easily detached.

Other two-shaft shredders are known, for example, from EP 3 566 777 A1, DE 10 2007 049 028 A1, US 2014 0103152 A1, EP 2 662 143 A2, DE 4 315 671 A1, EP 3 453 460 A1 and EP 2 736 645 A1.

It is an object of the present invention to provide a two-shaft shredder of the type mentioned above, which is improved with regard to maintenance and/or wear or service life. In particular, it should be user-friendly, time-saving in maintenance and preferably prevent errors.

SUMMARY OF THE INVENTION

In a first aspect, this object is solved by a two-shaft shredder characterized in that the first cutter disc unit has, at a first axial end, a first bearing unit with a first bearing housing and, at a second axial end, a second bearing unit with a second bearing housing, in which the first cutter disc block is rotatably mounted about a first axis of rotation. The second cutter disc assembly has, at a first axial end, a third bearing unit having a third bearing housing and, at a second axial end, a fourth bearing unit having a fourth bearing housing in which the second cutter disc block is rotatably mounted about a second axis of rotation. According to the invention, the shredder housing further comprises a first maintenance hatch cover, which can assume a release position and a closed position and, in the release position, permits removal of the first cutter disc unit together with the first and second bearing units.

The invention, according to this first aspect, is based on two main findings: Firstly, the inventors have recognized that it is advantageous to provide the cutter disc unit, comprising the cutter disc block as well as two bearing units, as a structural unit, which can be removed from the device as a whole. In this way, problems with the bearing of the cutter disc blocks can be avoided. These bearing units each have a bearing housing, which can then be connected to the shredder housing and attached to it. It is, therefore, not necessary to also dismantle the bearings of the cutter disc blocks when replacing or changing the cutter disc blocks. Rather, the bearings are removed directly and completely along with them. This also makes it easier to maintain the bearings themselves. In solutions in the prior art that propose, for example, the separable shafts and the like described at the outset, the bearings remain in the shredder housing and only the shafts together with the knives are replaced. This then subsequently makes maintenance of the bearings more difficult, which in turn entails almost complete disassembly of the entire two-shaft shredder. To avoid this, it is proposed in accordance with the invention to remove the first and second bearing housings together with the cutter disk block.

A second fundamental idea of the invention is that a first maintenance hatch cover is provided which allows the cutter disc unit to be removed. Thus, it is not necessary, for example, to remove a feed hopper or the like or to remove a pipe at the outlet opening in order to remove the first cutter disc unit. Rather, the first maintenance hatch cover provides access to the shredder housing such that the first cutter disc unit can be removed.

The first and second cutter disc units can be designed as known from DE 20 2010 010 662 U1, namely, in particular, as monolithic cutter disc blocks. In this case, the cutter discs are formed integrally with the respective hub bodies. The term "hub body" is therefore not to be understood strictly as a shaft/hub connection in the context of the present disclosure, but rather defines an internal area relative to the cutter discs. However, the cutter disc units can also be formed from a shaft with individual blades detachably attached thereto, as is also known in the prior art. Mixed forms or other designs are also conceivable and preferred. Particularly preferred, however, are monolithic cutter disc blocks, with shaft journals provided directly at the respective inner shafts, which are then received in the first and second bearing units. In this embodiment, monolithic cutter disc blocks and inner shafts are formed in one piece and are manufactured from a semifinished product. This provides particularly high rigidity and simplifies production of the cutter disc blocks.

According to the invention, it can be provided that the first maintenance hatch cover only allows removal of the first cutter disc unit. That is, when the maintenance hatch cover has been moved from the closed position to the release position, only the first cutter disc unit can be removed. However, it may also be provided that the first maintenance hatch cover allows the second cutter disc unit to be removed as well. In the release position of the first maintenance hatch cover, this then allows both removal of the first cutter disc unit and removal of the second cutter disc unit. In this way, particularly simple and comprehensive maintenance can be achieved.

In a first preferred embodiment, however, the shredder housing has a second maintenance hatch cover which can assume a release position and a closed position and, in the release position, permits removal of the second cutter disc unit together with the third and fourth bearing units. Accordingly, only the first cutter disc unit can be removed through the first maintenance hatch cover and only the second cutter disc unit can be removed through the second maintenance hatch cover, preferably. To remove the first cutter disc unit, the first maintenance hatch cover must therefore be brought from the closed position to the release position, and to remove the second cutter disc unit, the second maintenance hatch cover must be brought from the closed position to the release position. Each cutter disc unit has thus clearly assigned its own maintenance hatch cover. This means that only the maintenance hatch cover associated with the cutter disc unit to be maintenanced needs to be opened. If, for example, both cutter disc units are accessible through a single maintenance hatch cover, it is necessary to remove the cutter disc unit in front of it in order to service the rear cutter disc shaft.

Preferably, the bearing units include the first, second, third, and fourth bearing units, seals, so as to seal the bearings of the bearing units against the cutter disc blocks. The bearings of the bearing units, which are usually ball bearings, roller bearings or the like, must be protected against water ingress from the comminution chamber into the bearings. Seals are provided for this purpose. The seals are also part of the bearing units and are housed inside the respective bearing housing. That is, the seals are removed from the shredder housing along with the cutter disc units when they are removed, so that they can also be replaced or serviced. In addition, there is no risk of damaging the corresponding seals when simply removing the cutter disc blocks from the shredder housing. This improves maintenance and the service life of the two-shaft shredder. The bearing housings together with bearings and seals, which are arranged at the ends of the cutter disc blocks, form an integrated bearing and seal concept here, which allows particularly easy maintenance.

In the assembled state, the respective bearing housings of the bearing units can preferably be fixed to the shredder housing against rotation. In this manner, the bearing units further serve to fix the cutter disc units to the shredder housing. For example, the bearing units can be fastened to the shredder housing by means of screw and/or clamp connections.

The shredder housing preferably has an inlet side having the inlet opening, an outlet side having the outlet opening, and first and second end sides arranged perpendicular to the first and second axes of rotation. Further, the shredder housing preferably includes first and second transverse sides. Accordingly, the shredder housing is preferably formed in a substantially cuboid shape. Preferably, the first maintenance hatch cover is arranged at the first transverse side and the second maintenance hatch cover is arranged at the second transverse side. In this way, it is particularly apparent that other attachment elements on the shredder housing, such as in particular peripheral devices on the inlet opening, peripheral devices on the outlet opening or peripheral devices on the end faces, do not have to be removed or dismantled in order to remove the first and second cutter disc units from the shredder housing. This greatly simplifies maintenance. It has been found that two-shaft shredders, when installed in plants, often have peripheral equipment or attachments on both the inlet and outlet sides that cannot be readily removed. By arranging the maintenance hatch covers on the transverse sides, particularly easy maintenance is achieved. Preferably, the shredder housing is thereby oriented so that the axes of rotation of the first and second cutter disc units are aligned horizontally. The first and second cutter disc units can then be removed perpendicular to their axis of rotation, but parallel to the plane formed by the two axes of rotation. This is again particularly easy, since for this purpose, for example, lift trucks and the like can be provided to remove the cutter disc units from the shredder housing and to service them.

In a preferred embodiment, it is provided that the first cutter disc unit is positively fastened to the shredder housing by means of first and second counter-holders. In a corresponding manner, the second cutter disc unit is preferably also positively fastened to the shredder housing by means of third and fourth counter-holders. The first and second, or third and fourth, counter-holders can, for example, be fastened to the shredder housing in such a way that the corresponding bearing housings are each frictionally held there between the counter-holders and the shredder housing. The counter-holders then serve, on the one hand, to provide sufficient stability for the first and second cutter disc units, but at the same time serve as an anti-loss device when the first and second maintenance hatch covers are in the release position. In this embodiment, the first and second maintenance hatch covers are not intended to absorb forces or support or hold the first and second cutter disc units against the shredder housing. Transverse forces and moments can be supported by the first, second, third, and fourth mating retainers and also by additionally provided bolted connections between the respective bearing housings and the shredder housing.

Preferably, the first and second counter-holders are covered by the first maintenance hatch cover when it is in the closed position. In the release position of the first maintenance hatch cover, the first and second mating holders are preferably released. In this way, on the one hand, fastening elements of the mating holders can be protected, and on the other hand, loosening of the first and second mating holders is prevented when the first maintenance hatch cover is in the closed position. The same preferably also applies to the second maintenance hatch cover. Accordingly, the second maintenance hatch cover preferably covers third and fourth counter-holders when the latter is in the closed position. When the second maintenance hatch cover is in the release position, it preferably releases the third and fourth mating supports.

A first parallel kinematic system can be provided for moving the first maintenance hatch cover from the closed position to the release position and vice versa. The parallel kinematics enables, for example, the first maintenance hatch cover to be lifted without the maintenance hatch cover rotating about its own axis. It has been found that such a parallel kinematic system is well suited for moving the maintenance hatch cover from the closed position to the release position. In the prior art, concepts are known in which maintenance hatch covers are rotated around a hinge in the manner of a door. In this case, however, it is not possible to also provide scrapers on the maintenance hatch covers. By means of parallel kinematics, a maintenance hatch cover can be raised relative to the shredder housing so that scrapers can be attached to the maintenance hatch covers without any problems, since these are only moved parallel to the cutter discs even when the maintenance hatch cover is opened. At the same time, the maintenance hatch cover then opens up a large area very easily accessible in the release position. The same again preferably applies to the second maintenance hatch cover, for which a second parallel kinematic system can be provided. The first and second parallel kinematics are preferably identical.

Furthermore, it is preferably provided that a first lifting device acts on the first parallel kinematics in order to move the first maintenance hatch cover from the closed position to the release position. The first lifting device is preferably designed as a hydraulic device, pneumatic device, spindle drive, or electromagnetic drive. Preferably, the lifting device can control a force or support forces so that an operator can more easily bring the first maintenance hatch cover into the release position. The same again preferably applies to the second maintenance hatch cover, on which a second lifting device is preferably provided.

Preferably, at least one of the first and second cutter disc blocks, preferably both, is provided with at least one first groove, respectively. The first groove is preferably designed as a circumferential groove and extends circumferentially around the axis of rotation of the respective cutter disc block. The first groove is preferably provided between two adjacent cutter discs of the respective cutter disc block. Preferably, a second groove is provided in each case at an axial distance from the first groove. The grooves can be used to guide the respective cutter disc block on a carrier when the corresponding cutter disc block is removed from the shredder housing. Such carriers can then be attached to the shredder housing for the purpose of removing the first and/or second cutter disc block.

In a second aspect of the invention or a preferred further embodiment of the two-shaft shredder according to the first aspect of the invention, the two-shaft shredder further comprises a first drive motor preferably adapted to drive the first cutter disc block via a first transmission, a second drive motor preferably adapted to drive the second cutter disc block via a second transmission, and an electronic control unit for controlling the two drive motors. The provision of two motors allows the first and second cutter disc blocks to be driven independently, thus allowing the two-shaft shredder to be operated in different modes. The drive motors can be of any type, for example electric motors, hydraulic motors, or the like.

Preferably, a first coupling is provided between the first cutter block and the first drive motor or the first transmission, and a second coupling is provided between the second cutter block and the second drive motor or the second transmission. The first coupling preferably has a first centering means for centering the first drive motor or the first transmission with respect to the first cutter disc block, and the second coupling preferably has a second centering means for centering the second drive motor or the second transmission with respect to the second cutter disc block. The first and second centering devices are preferably self-centering. When removing the first and second cutter disc units from the two-shaft shredder, the first and second couplings are preferably to be disengaged to thereby disengage the cutter disc blocks from the first and second drive motors and gears, respectively. The first and second clutches are preferably rigid clutches. The first and second centering devices are preferably further provided for aligning the first and second cutter disc blocks and the first and second drive motors and transmissions, respectively. In this way, in addition to radial misalignment, angular errors can also be compensated for and the respective elements can be aligned with respect to each other.

The first and second centering devices preferably each have corresponding cone sections which engage with each other in a clamping manner. They preferably engage with each other in such a way that self-centering is achieved. For example, a female cone is provided on a gear or motor output shaft and a male cone is provided on a corresponding stub shaft or shaft journal of the cutter block. The cone angle is preferably selected so that no self-locking or friction locking occurs.

Furthermore, it is preferred that the first and/or second drive motor are floatingly mounted. Preferably, they are mounted on the shredder housing or on a machine frame. Preferably, when the first and second couplings are engaged, the drive motors are carried by the first and second cutter disc units and supported transversely to the respective axis of rotation. Preferably, the first and second drive motors, together with first and second gears, if applicable, are supported by first and second torque supports. However, the first and second torque supports do not serve to center the first and second drive motors and/or gear units. Only when the first and second couplings are disengaged, the first and second torque supports preferably also support the respective weight of the first and second drive motors, if applicable, together with the first and second gear units. This greatly simplifies assembly and disassembly of the cutter disc units. It is not necessary to assemble or disassemble the drive motors separately and center them relative to the cutter disc units, as was necessary in the prior art. Instead, only the couplings have to be opened or closed, and all this does is release the drive motors from the cutter disc blocks or couple them to them and center them at the same time.

In another preferred embodiment, the electronic control unit is connected to the first drive motor, wherein the electronic control unit is arranged to control the drive motors in at least a first operating mode and a second operating mode that is different from the first operating mode. The first and second operating modes preferably differ in direction of rotation, speed, torque, speed change, and/or drive profile of the first and second cutter blocks.

Preferably, the electronic control unit is connected to the first drive motor to supply electrical power thereto and preferably to determine a first current consumption of the first drive motor, and is connected to the second drive motor to supply electrical power thereto and preferably to determine a second current draw of the second drive motor.

Preferably, the electronic control unit is further arranged to control the drive motors in the first operating mode in such a way that the cutter disc blocks are driven in opposite directions with substantially identical rotational speed and to control the drive motors in a second operating mode in such a way that the cutter disc blocks are driven at different rotational speeds and/or in the same direction of rotation.

According to the second aspect, the invention is based on the finding that it is particularly advantageous to provide two drive motors which can be controlled independently of one another. In this way, different speeds, including variable speeds, can be easily set and different operating modes can be performed. In the prior art, two-shaft shredders are generally driven by a single drive motor, with the cutter disc blocks then being coupled to each other via a gearbox. Although two-shaft shredders that use two drive motors are also known in principle, these are then not independently controllable. The independent control of the drive motors allows not only the selection of certain operating modes but also a diagnosis of the two-shaft shredder. Thus, the respective current consumptions of the drive motors and thus the torques applied to the respective cutter disc blocks can be determined. If, for example, one of the cutter disc blocks is found to be carrying a significantly increased load over a certain period of time, this may indicate a fault in the two-shaft shredder. On the one hand, a foreign object could have become caught in the area of the cutter disc block, causing an increased load. On the other hand, there could also have been bearing damage to the corresponding cutter disc block. Both can be determined by the increased load absorption of the respective drive motor.

If the two cutter disc blocks are driven in opposite directions at essentially identical speeds, uniform size reduction is achieved. Different speeds, on the other hand, result in a stronger relative movement between the cutter disc blocks, so that they can "mill" each other free. Here it is particularly advantageous if, in the second operating mode, first the first cutter disc block is driven at a first speed and the second cutter disc block is driven at a second speed, wherein, over a first predetermined period of time, the first speed is higher than the second speed, and then, over a second predetermined period of time, the second speed is higher than the first speed. In this way, the respective spaces between the blades of the cutter disc blocks can be mutually milled free. In addition, such alternating speed variation of the cutter disc blocks results in a more uniform load and thus more uniform wear on them. Both result in improved maintenance and an improved service life of the two-shaft shredder.

A co-rotating direction of rotation of the cutter disc blocks is particularly useful if a foreign body would become trapped in the shredding chamber. For example, it is possible to open one of the maintenance hatch covers and drive the cutter disc blocks in the same direction, so that the foreign body can be conveyed out of the two-shaft shredder through the opened maintenance hatch cover. If a corresponding maintenance hatch cover is provided, as according to the first aspect of the invention, and also, for example, a lifting device, such as a hydraulic system, for opening the corresponding maintenance hatch cover, this can also be automated and/or cyclic. In this case, the electronic control unit also controls the lifting device to cause the maintenance hatch cover to be opened for a short time. The control unit can have or be connected to an enabling switch via which the opening of the corresponding maintenance hatch cover is additionally enabled. Such an enabling switch can increase the safety of the operator. After the foreign object has been ejected, the maintenance hatch cover can then be moved back to the closed position, if necessary by means of the electronic control unit.

Preferably, the electronic control unit includes an internal memory and a processor, the internal memory having code means stored therein which, when executed by the processor, causes the electronic control unit to control the first and second drive motors as described.

In a preferred embodiment, the electronic control unit is set up to control the drive motors in such a way that the cutter disc blocks have a low differential speed relative to each other. A low differential speed has proven to be particularly suitable for milling an intermediate space between the cutter discs. Here, too, it is preferred that alternately one and then the other cutter disc block are driven at a higher speed. These predetermined periods are preferably about 30 seconds, 1 minute, 2 minutes, 10 minutes, or 1 hour.

In a preferred embodiment, the electronic control unit is set up to control the drive motors in such a way that only one of the cutter disc blocks rotates while the other is stationary. This is particularly useful for conveying stuck elements in gaps out of the stationary cutter disc block. It can also be provided that the stationary cutter disc block rotates at a very low speed, which is about 10% or 5% of the speed of the faster rotating cutter disc block. In this way, it is possible to mill the stationary or slowly rotating cutter block free all around, little by little.

In the process, the rotating cutter disc block preferably rotates in the opposite direction to the shredding direction. This allows stuck elements to be conveyed in the direction of the inlet opening and finally out of the two-shaft shredder through, for example, one of the open maintenance hatch covers.

It has been shown that various control strategies can be used to solve problems within the two-shaft shredder. For example, as a first problem-solving strategy, the ratio of the rotational speeds can be swapped. That is, for example, if the first cutter block rotates at a higher speed than the second cutter block, this is reversed and the second cutter block then rotates at a higher speed than the first cutter block. A second problem-solving strategy is to stop the one cutter block, or reduce it to 5-10% of the rotational speed of the second cutter block. A third problem-solving strategy is to change the direction of rotation of the rotating cutter disc block when the second problem-solving strategy is used. A fourth problem-solving strategy is to drive the cutter disc blocks in the same direction, preferably opening one or both of the maintenance hatch covers. It may also be envisaged, in a fifth problem-solving strategy, to vary the rotational speeds for a short time, for example, to pulse, to vary sinusoidally, or to drive at a maximum power for a short time. The electronic control unit can be designed to go through the aforementioned problem-solving strategies in sequence in the presence of a fault, which is determined in particular on the basis of the current consumption of the first and second drive motors. Each problem solving strategy is preferably executed for a predetermined duration. If it is determined that the fault still exists or has not been sufficiently corrected, the next problem-solving strategy is applied. It may be provided here that the electronic control unit is adapted to learn. In particular, learning can consist in the fact that if a further error occurs after the first error has been corrected, the electronic control unit then applies the last successful problem-solving strategy first and the others only afterwards. In this way, efficiency can be increased. Preferably, a hierarchy of problem-solving strategies is stored in the electronic control unit, which is determined by the frequency of their success. It is preferred to then apply the problem-solving strategies according to this hierarchy.

In a preferred further development, the gear units are bevel gear units. On the one hand, bevel gear units are efficient, and on the other they permit a particularly space-saving arrangement of the drive motors. Preferably, the bevel gear units are designed as helical gear units so that noise reduction and surface pressure within the gear unit can be reduced.

In a third aspect, the invention solves the above-mentioned problem by a method for servicing a two-shaft shredder, preferably a two-shaft shredder according to one of the preferred embodiments of a two-shaft shredder described above according to the first aspect and/or the second aspect of the invention. The method comprises the steps of: Moving a first maintenance hatch cover from a closed position to a release position; and horizontally and laterally removing a first cutter disc unit comprising a first cutter disc block having a plurality of first cutter discs arranged on a first hub body such that there is a space between each two adjacent first cutter discs, the first cutter disc unit having at a first axial end a first bearing unit having a first bearing housing and at a second axial end a second bearing unit having a second bearing housing in which the first cutter disc block is rotatably supported about a first axis of rotation. Lateral removal here preferably refers to a flow direction of the two-shaft shredder from an inlet opening to an outlet opening. Laterally, with respect to the inlet opening and the outlet opening, the cutter disc unit is removed horizontally according to this method. It is to be understood that by horizontal is not meant strictly geometrically, but that a substantially horizontal removal is sufficient.

The two-shaft shredder according to the first aspect of the invention as well as the method according to the third aspect of the invention have similar and identical sub-aspects as set forth herein. In this respect, full reference is made to the above description concerning the first aspect of the invention. By the method, similar or the same advantages are manifested as described with reference to the two-shaft shredder according to the first aspect of the invention. In particular, the first cutter disc assembly can be removed from the two-shaft shredder without disassembling an inlet hopper or the like. According to the invention, this is done laterally and horizontally, so that the replacement is substantially simplified. Preferably, the method also comprises the step of: horizontally and laterally removing a second cutter disc unit comprising a second cutter disc block having a plurality of second cutter discs arranged on a second hub body such that there is a space between each two adjacent second cutter discs, the second cutter disc unit having at a first axial end a third bearing unit having a third bearing housing and at a second axial end a fourth bearing unit having a fourth bearing housing in which the second cutter disc block is rotatably mounted about a second axis of rotation. Preferably, the first cutter disc unit or the second cutter disc unit is removed from the two-shaft shredder transversely to its respective axis of rotation.

Preferably, the steps are performed without exposing an inlet opening and/or outlet opening, in particular, without disassembling a hopper at the inlet opening and/or an outlet tube at the outlet opening.

According to an embodiment, it may be provided that a step of releasing a counter-holder is performed, prior to the step of removing. Preferably, the step of releasing the counter-holder is performed after the step of moving a first maintenance hatch cover from a closed position to a release position. The step of releasing a counter-holder may comprise releasing a first, second, third and fourth counter-holder, in particular, by means of releasing a screw connection between the first, second, third, and/or fourth counter-holder and a shredder housing of the two-shaft shredder.

Preferably, the method further comprises the steps of: horizontally and laterally inserting a cutter disc unit, preferably attaching a counter-holder for positively and/or non-positively securing the first cutter disc unit to the shredder housing, and moving the first maintenance hatch cover from the release position to the closed position.

Furthermore, in a fourth aspect, the invention comprises a method for operating a two-shaft shredder, preferably a two-shaft shredder according to one of the embodiments described above of a two-shaft shredder according to the first and/or second aspect of the invention. The method for operating a two-shaft shredder may also be understood as a further development of the method for servicing a two-shaft shredder, and the steps described below may, in particular, follow or be carried out prior to servicing the two-shaft shredder. In a first embodiment, the method for operating a two-shaft shredder comprises the steps: Driving two cutter disc blocks in a first operating mode for a first operating period; terminating the first operating mode at the end of the first operating period; and driving the two cutter disc blocks in a second operating mode for a second operating period.

Preferably, the first mode of operation comprises driving the two cutter disc blocks in opposite directions at substantially identical speeds and the second mode of operation comprises driving only one of the two cutter disc blocks while the other is stationary. The counter-rotating driving of two cutter disc blocks at substantially identical speeds for a first operating period is preferably performed during normal operation of the two-shaft shredder. In a cleaning operation, then, preferably only one of the two cutter disc blocks is driven while the other is stationary. In this way, intermediate spaces in the stationary cutter disc block can be "milled free" by means of the rotating cutter disc block and cleaned of parts stuck there.

Additionally or alternatively, the cutter blocks can be driven at substantially identical speeds in the first operating mode and at different speeds in the second operating mode. They can also be driven in opposite directions in the first operating mode and in the same direction in the second operating mode.

While the two cutter disc blocks are driven in opposite directions at essentially identical speeds, the speeds are preferably alternated. Essentially identical speeds also include speeds that differ slightly from each other. During normal operation, preferably one of the cutter disc blocks is rotated at a higher speed than the other cutter disc block. In this respect, the method during normal operation preferably comprises the steps: Driving the first cutter disc block at a first rotational speed and driving the second cutter disc block at a second rotational speed, the first rotational speed being higher than the second rotational speed, for a first portion of the first operating period. Driving the first cutter disc block at a first speed and driving the second cutter disc block at a second speed, while the second speed is higher than the first speed, during a second portion of the first operating period subsequent to the first portion. This may be followed by third, fourth and fifth sections, in which case the third section is preferably formed like the first section and the fourth section is formed like the second section. Preferably, the same applies to further N+1 sections. The method preferably further comprises the steps of: moving a side maintenance hatch cover from a closed position to a release position; and driving the two cutter disc blocks in the same direction towards the maintenance hatch cover to eject a foreign object. Preferably, the cutter disc blocks rotate slower in this process than in a normal operation, preferably at a speed that is about 10% of the maximum speed or less.

It may happen that elements get into the shredding chamber via the inlet opening that cannot be shredded by means of the cutter disc blocks. This can concern, for example, larger pieces of metal, stones, and the like. Such foreign bodies must then be ejected. On the one hand, this can be done manually by an employee reaching into the inlet opening via the inlet hopper and—with the cutter disc blocks stationary—manually removing the foreign body. According to the solution proposed here, however, a lateral maintenance hatch cover, either a first or second maintenance hatch cover, is moved from a closed position to a release position and the cutter disc blocks are rotated in the direction of the maintenance hatch cover. That is, the cutting teeth of the cutter disc blocks, which are on top with respect to an orientation of the two-shaft shredder, move in the direction of the maintenance hatch cover. Thus, if the maintenance hatch cover is at three o'clock with respect to the axes of rotation of the cutter disc units, the cutter disc blocks should rotate clockwise. If the maintenance hatch cover is at nine o'clock, the cutter disc blocks rotate counterclockwise. The foreign object typically rests on top of the cutter disc blocks, as it cannot be crushed. By driving the cutter disc blocks in the direction of the maintenance hatch cover in the same direction, it is therefore possible to convey the foreign body out of the shredding chamber. These steps can also be performed instead of the step: driving only one of the two cutter disc blocks while the other one stands still for a second operating period. The opening of the first or second maintenance hatch cover can be done by means of the control unit. This may comprise or be connected to an enabling switch. The method may comprise the step of: Enabling the moving of the first maintenance hatch cover from the closed position to the enabled position by means of the enabling switch.

Preferably, the method further comprises: closing the maintenance door after ejecting the foreign object and driving the first and second cutter disc blocks in normal operation. Preferably, normal operation comprises driving the cutter disc blocks in opposite directions at substantially identical speeds.

It is further preferred that the method comprises the steps of: detecting a first power draw of a first drive motor of the first cutter block; detecting a second power draw of a second drive motor of the second cutter block; and determining a fault of the two-shaft shredder based on the detected first and second power draws. For example, in the case of electric motors as drive motors, current consumption can be measured. Alternatively, torques, stresses in shafts, forces in bearings or couplings, noise, or the like can be detected.

Embodiments of the invention are now described below with reference to the drawings. These are not necessarily intended to show the embodiments to scale; rather, where useful for explanation, the drawings are in schematized and/or slightly distorted form. With regard to additions to the gauges directly recognizable from the drawings, reference is made to the relevant prior art. It should be borne in mind that a wide variety of modifications and changes concerning the shape and detail of an embodiment can be made without departing from the general idea of the invention. The features of the invention disclosed in the description, in the drawings as well as in the claims may be essential for the further development of the invention both individually and in any combination. In addition, all combinations of at least two of the features disclosed in the description, the drawings and/or the claims fall within the scope of the invention. The general idea of the invention is not limited to the exact form or detail of the preferred embodiments shown and described below, or limited to any subject matter that would be limited as compared to the subject matter claimed in the claims. In the case of specified design ranges, values within the specified limits are also intended to be disclosed as limiting values and to be capable of being used and claimed as desired. For simplicity, identical reference signs are used below for identical or similar parts or parts with identical or similar function.

BRIEF DESCRIPTION OF THE DRAWINGS

Further advantages, features, and details of the invention will be apparent from the following description of preferred embodiments and from the drawings; these are shown in.

DETAILED DESCRIPTION OF THE EMBODIMENTS

Figure 1:
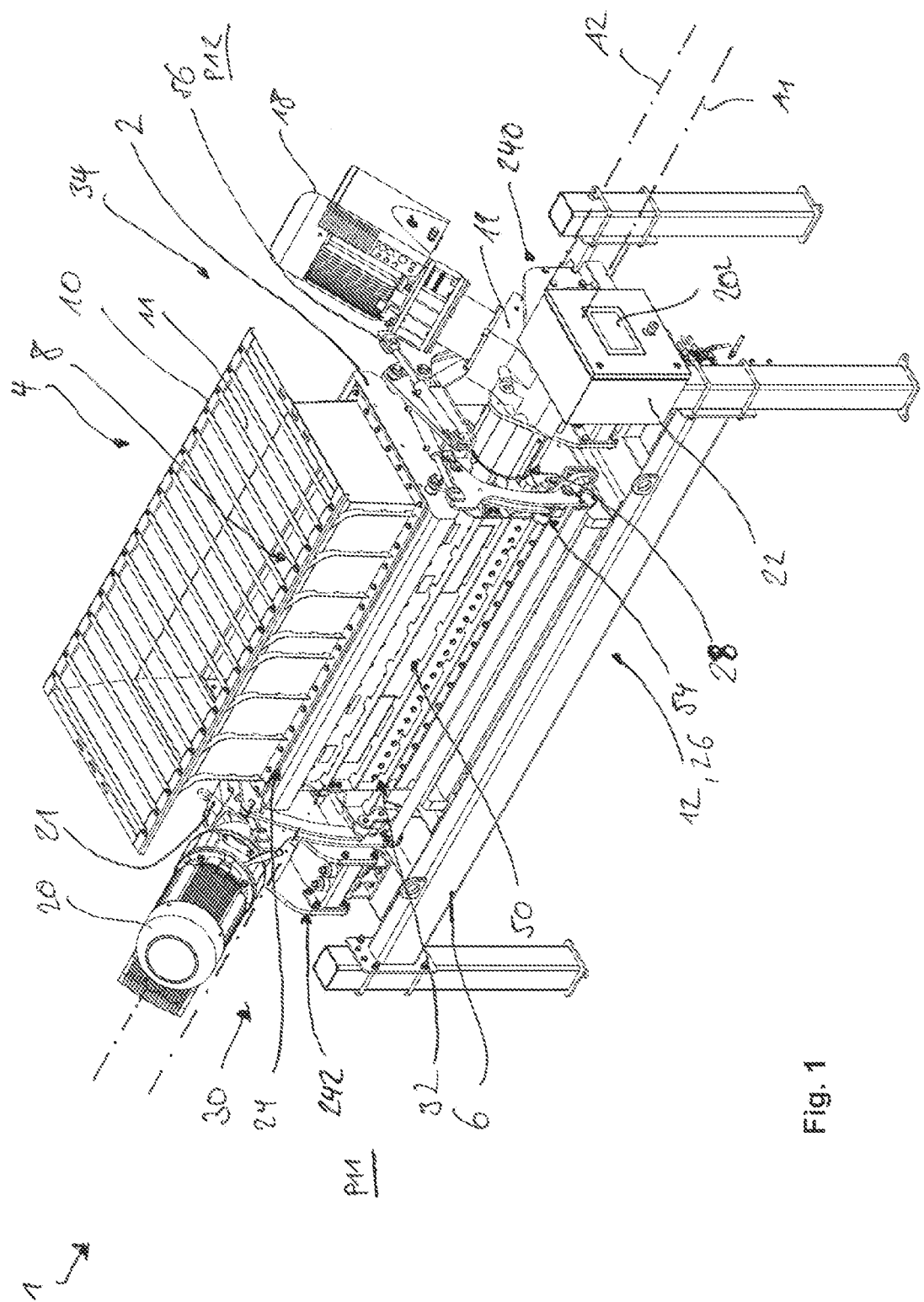
FIG. 1 is a perspective view of a two-shaft shredder with closed first and second maintenance hatch covers.

A two-shaft shredder 1 for shredding solids or solids in liquids has a shredder housing 2 which defines an internal shredding chamber 4. The shredder housing 2 is arranged here on a machine frame 6 which supports the shredder housing 2. On the upper side of the shredder housing 2, with reference to FIG. 1, an inlet opening 8 is formed which is provided here with a feed hopper 10. The feed hopper 10 in turn has a grate 11 to prevent excessively large objects from passing through the feed hopper 10 into the inlet opening 8. The grate 11 is optional and can likewise be omitted, for example, if larger objects are to be filled into the feed hopper 10. With reference to FIG. 1, the outlet opening 12 of the two-shaft shredder 1 is arranged on the underside and cannot be seen in detail here. The outlet opening 12 is arranged opposite the inlet opening 8 so that fluid can flow vertically through the two-shaft shredder 1 from top to bottom with reference to FIG. 1. When installed, the outlet opening 12 may be connected to a pipe or the like to discharge the shredded material.

Inside the shredding chamber 4, first and second cutter disc units 14, 16 rotate in operation and are described in further detail below with reference to FIGS. 4, 6, 7, and 8.

The first cutter disc unit 14 has a first axis of rotation A1 and the second cutter disc unit 16 has a second axis of rotation A2. The axes of rotation A1, A2 are parallel to each other, but offset. In this way, individual blades of the cutter disc units 14, 16 can mesh with each other to cut material. This is known in principle.

A first drive motor 18 is provided for driving the first cutter disc unit 14, and a second drive motor 20 is provided for driving the second cutter disc unit 16. Both are controlled by a common electronic control unit 22, which is also attached here to the machine frame 6. The electronic control unit 22 will also be described in more detail later. The first drive motor 18 is equipped with a first gear 19 and is connected to the first cutter disc unit 14 via this gear. The second drive motor 20 is equipped with a second gear 21, and is connected via this to the second cutter disc unit 16. In this way, the accommodation of the first and second drive motors 18, 20 is simplified. The first and second gears 19, 21 are preferably bevel gears, but are not shown here in further detail.

As is further apparent from FIG. 1, the shredder housing 2 has an inlet side 24 at which the hopper 10 is received, and in which the inlet opening 8 is formed. The inlet side 24 is oriented substantially upward in the embodiment shown in FIG. 1. Furthermore, the shredder housing 2 has an outlet side 26 comprising the outlet opening 12, which is here the underside of the shredder housing 2. First and second drive motors 18, 20 are provided at first and second end faces 28, 30, respectively. The first and second end faces 28, 30 are arranged substantially perpendicular to the first and second axes of rotation A1, A2 and interconnect the inlet side 24 and the outlet side 26. Further, first and second transverse sides 32, 34 are formed on the shredder housing 2.

One problem that has existed with conventional two-shaft shredders is the maintenance of the first and second cutter disc units 14, 16. For example, the first cutter disc unit 14 has a first cutter disc block 40 and the second cutter disc unit 16 has a second cutter disc block 42 (see FIGS. 4 and 7). Each of the cutter disc blocks 40, 42 is provided with a plurality of cutter discs, namely the first cutter disc block 40 is provided with first cutter discs 44 (in FIGS. 7 and 8, only one of each is provided with reference signs) and the second cutter disc block 42 is provided with second cutter discs 46. The first and second cutter discs 44, 46 are each axially spaced from one another so that the cutter discs 44, 46 of the first and second cutter disc blocks 40, 42 can mesh with one another, as is basically known in the prior art, in particular, with reference to DE 20 2010 010662 U1 and WO 2018 087 398. The cutter discs 44, 46 of the first and second cutter disc blocks 40, 42 wear out over time, so that these must be maintained, or replaced. To simplify this, the invention implements a horizontal maintenance concept, which is described below.

To enable horizontal maintenance, the two-shaft shredder 1, more specifically the shredder housing 2, has a first maintenance hatch cover 50, which is preferably formed on the first transverse side 32 of the shredder housing 2. Via the first maintenance hatch cover 50, the first cutter disc unit 14 can be removed from the shredder housing 2. It may be provided that the second cutter disc unit 16 can also be removed from the shredder housing 2 via the first maintenance hatch cover 50. According to the embodiment example shown here, however, the shredder housing 2 has a second maintenance hatch cover 52, which is assigned to the second cutter disc unit 16. In the following, the first and second maintenance hatch covers 50, 52 will always be described, it to be understood that there may also be embodiments comprising only one of the maintenance hatch covers 50, 52, which then provide access to both cutter disc units 14, 16.

Figure 2:
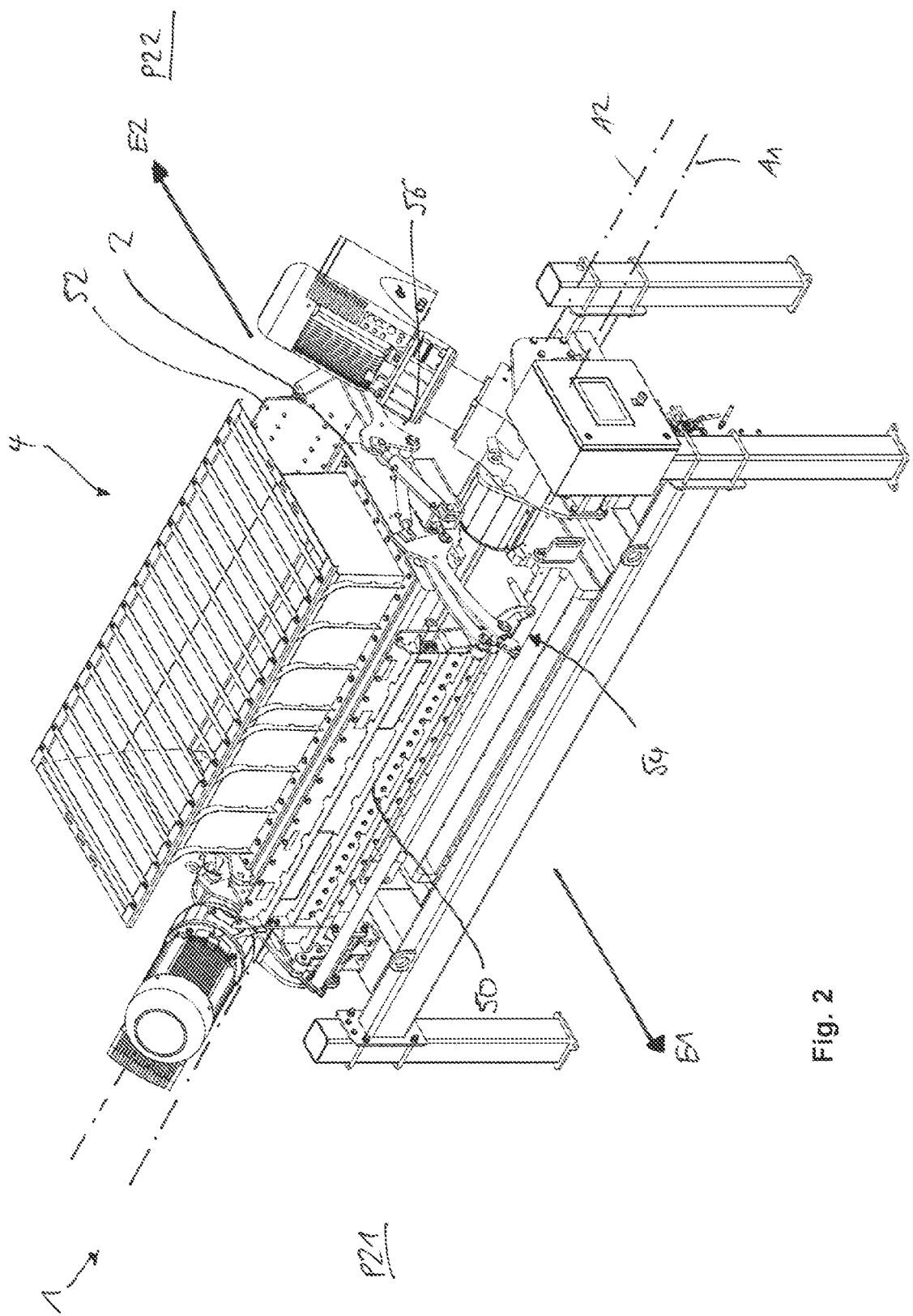
FIG. 2 is a perspective view of the two-shaft shredder of FIG. 1 with the first and second maintenance hatch covers open.
Figure 3A:
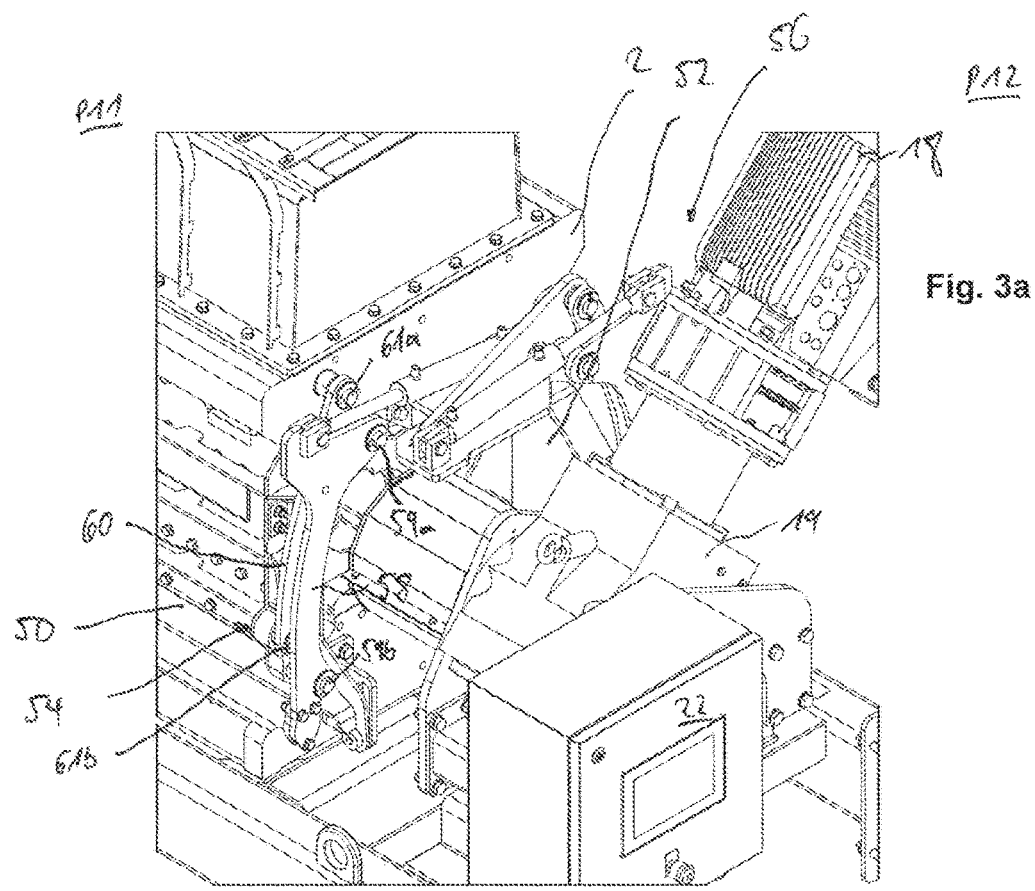
FIG. 3a is a detail from FIG. 1.

In FIG. 1, the first maintenance hatch cover 50 is shown in a closed position P11. The second maintenance hatch cover 52 is also in a closed position P12. In FIG. 2, however, the first maintenance hatch cover 50 is in a release position P21 and the second maintenance hatch cover 52 is also in a release position P22. In the release positions P21, P22, the first and second maintenance hatch covers 50, 52 are pivoted upwards, preferably without performing a rotation about their own axis. To enable this pivoting of the first and second maintenance hatch covers 50, 52, the two-shaft shredder 1 has a first parallel kinematic system 54 for the first maintenance hatch cover 50 and a second parallel kinematic system 56 for the second maintenance hatch cover 52. The first and second parallel kinematics 54, 56 are substantially identically configured, so that only the first parallel kinematic 54 will be described below. It should be understood that the second parallel kinematics 56 may be constructed in a manner analogous to the first parallel kinematics 54. The first and second parallel kinematics 54, 56 can be seen particularly well in FIGS. 3a and 3b, which will be referred to below. Further, the parallel kinematics 54, 56 are again illustrated in FIGS. 4 and 5. The first parallel kinematic system 54 has a first parallelogram lever 58 and a second parallelogram lever 60. The first parallelogram lever 58 is connected with a first articulation point 59a to the shredder housing 2 and a second articulation point 59b to the first maintenance hatch cover 50. The second parallelogram lever 60 is connected with a first articulation point 61a to the shredder housing 2 and a second articulation point 61b to the maintenance hatch cover 50. The first articulation points 59a, 61a of the first and second parallelogram levers 58, 60 are aligned substantially vertically one above the other and substantially above the maintenance hatch cover 50. In the closed position P11, P12, the first and second parallelogram levers 58, 60 are pivoted downwards so that the first maintenance hatch cover 50 is aligned substantially below the first and second articulation points 59a, 61a. The parallel kinematics 54 are connected to a first lifting device 62, which here comprises a first pneumatic cylinder 63. In the illustrated embodiment, the pneumatic cylinder 63 engages the first parallelogram lever 58 to pivot it about the first pivot point 59a. As a result, the first maintenance hatch cover 50 is lifted out of the closed position P11 and moved upwards so that it reaches the release position P21 shown in FIGS. 2, 3b, and 4.

The first and second parallel kinematics 54, 56 have only been described with reference to the first end face 28 of the shredder housing 2. A corresponding parallel kinematic system is also arranged on the second end face 30, so that the first and second maintenance hatch covers 50, 52 can be raised and lowered via two such parallel kinematic systems.

Figure 4:
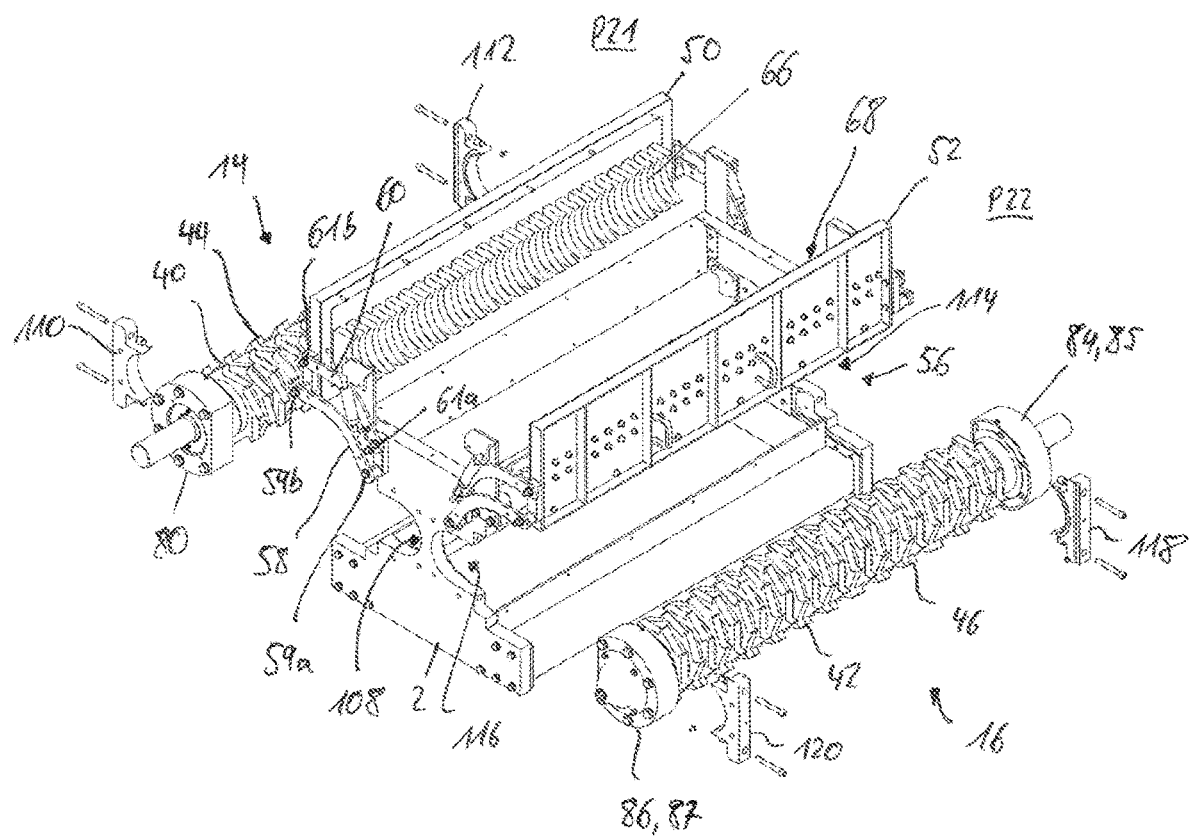
FIG. 4 is a schematic representation of the lateral removal of first and second cutter disc units.
Figure 5:
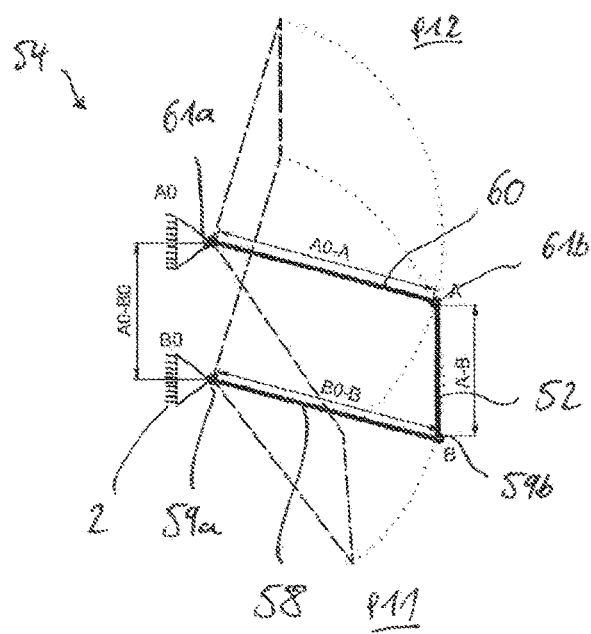
FIG. 5 is a schematic view of a parallel kinematic system for moving the first maintenance hatch cover from a closed position to a release position.

As can be seen in particular from FIG. 4, first and second scrapers 66, 68 are arranged on the first and second maintenance hatch covers 50, 52, which serve on the one hand to prevent non-crushed material from passing between the maintenance hatch cover 50, 52 and the corresponding cutter disc block 14, 16 during operation, and on the other hand also to keep the intermediate spaces between the first and second cutter discs 40, 44 free. The first and second scrapers 66, 68 are arranged here on the first and second maintenance hatch covers 50, 52 so that they are moved together with the first and second maintenance hatch covers 50, 52 from the closed position to the release position. In this way, the first and second cutter disc units 14, 16 are released particularly easily and extensively.

Figure 3B:
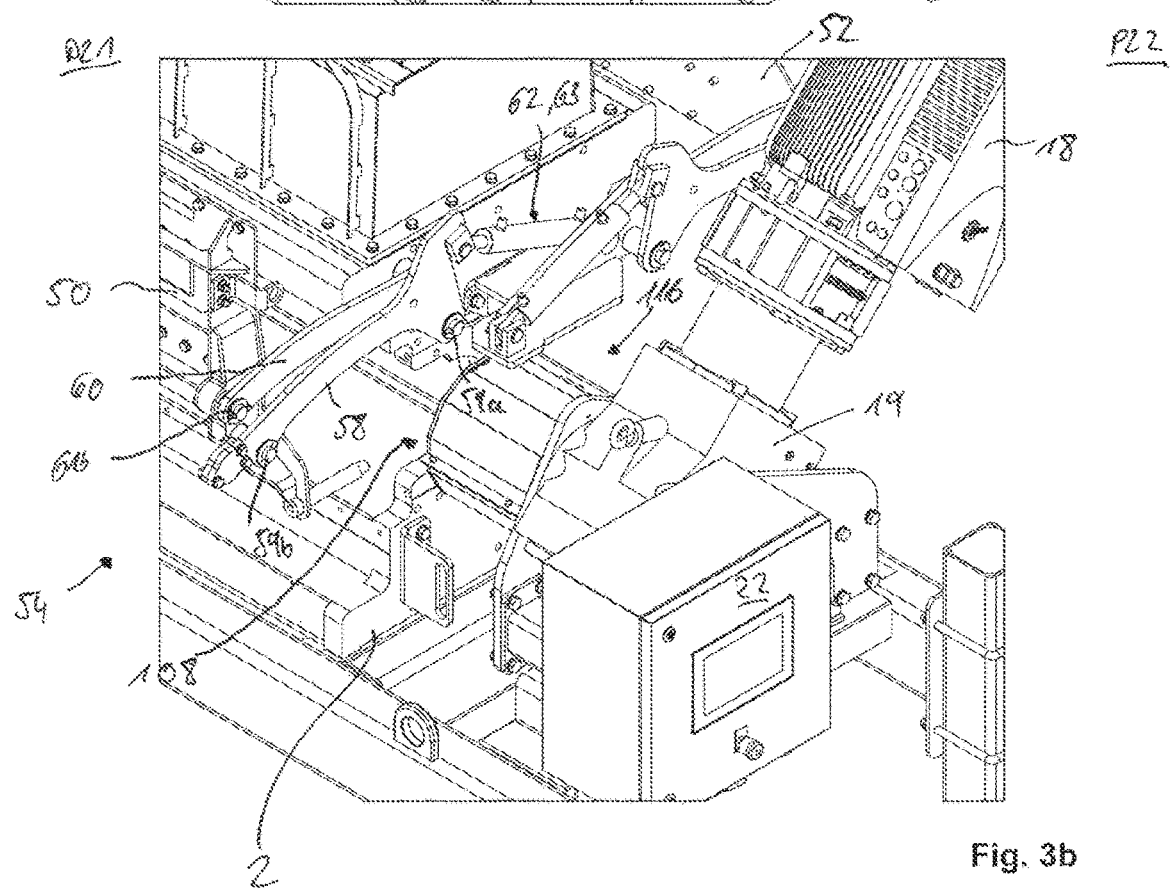
FIG. 3b is a detail from FIG. 2.

After the first and second maintenance hatch covers 50, 52 have been moved to the release position P21, P22, the first and second cutter disc units 14, 16 can basically be removed from the shredder housing 2 along first and second removal directions E1, E2 (cf. FIG. 2). In FIGS. 2 and 3b, the first and second cutter disc units 14, 16 have already been removed. Schematically, the removal of the first and second cutter disc units 14, 16 can be seen in FIG. 4 and will now be described in more detail with reference to FIGS. 4, 6, 7, 8, and 9.

Figure 7:
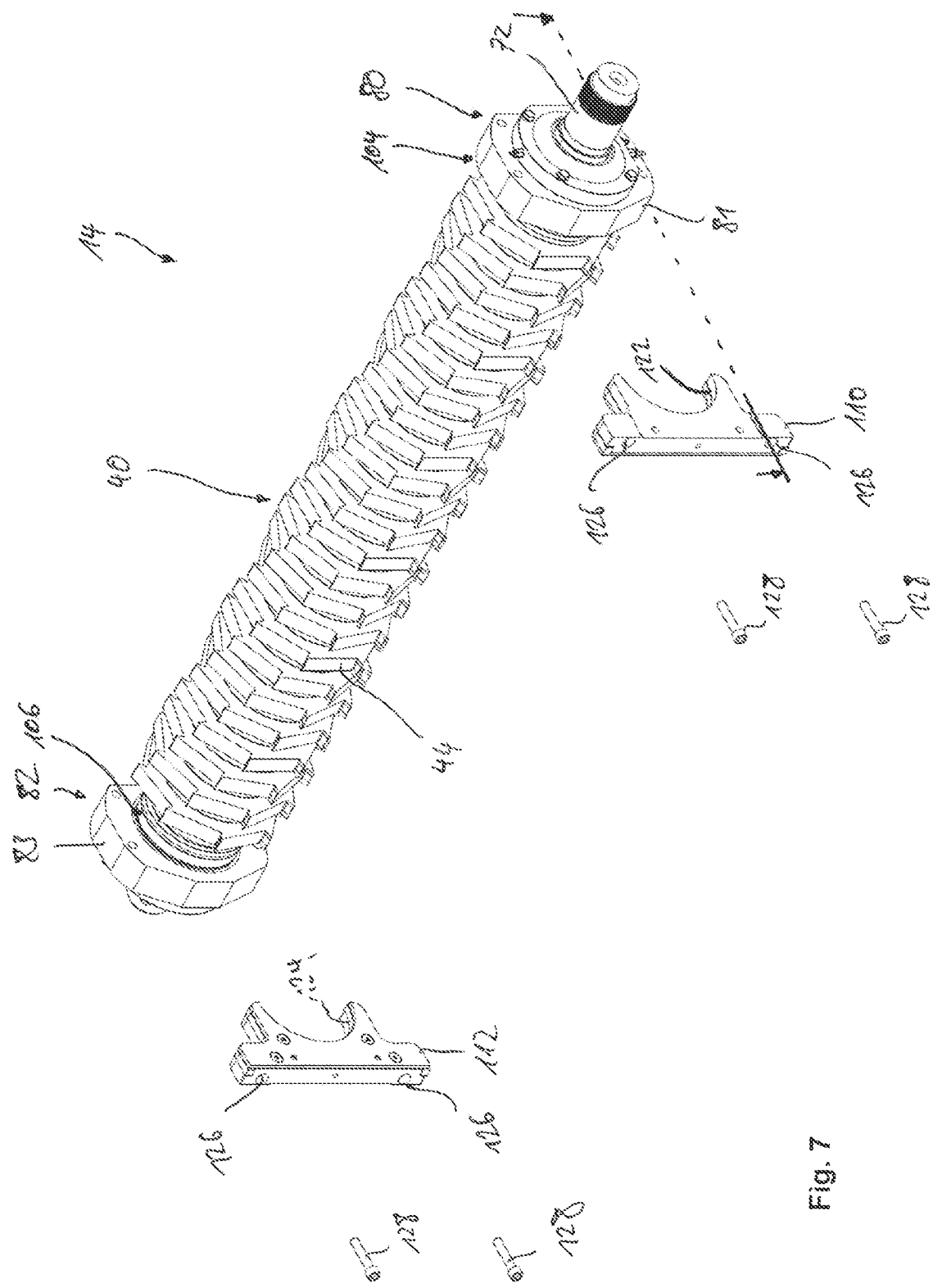
FIG. 7 is a perspective view of the cutter disc unit including first and second counter holders.
Figure 8:
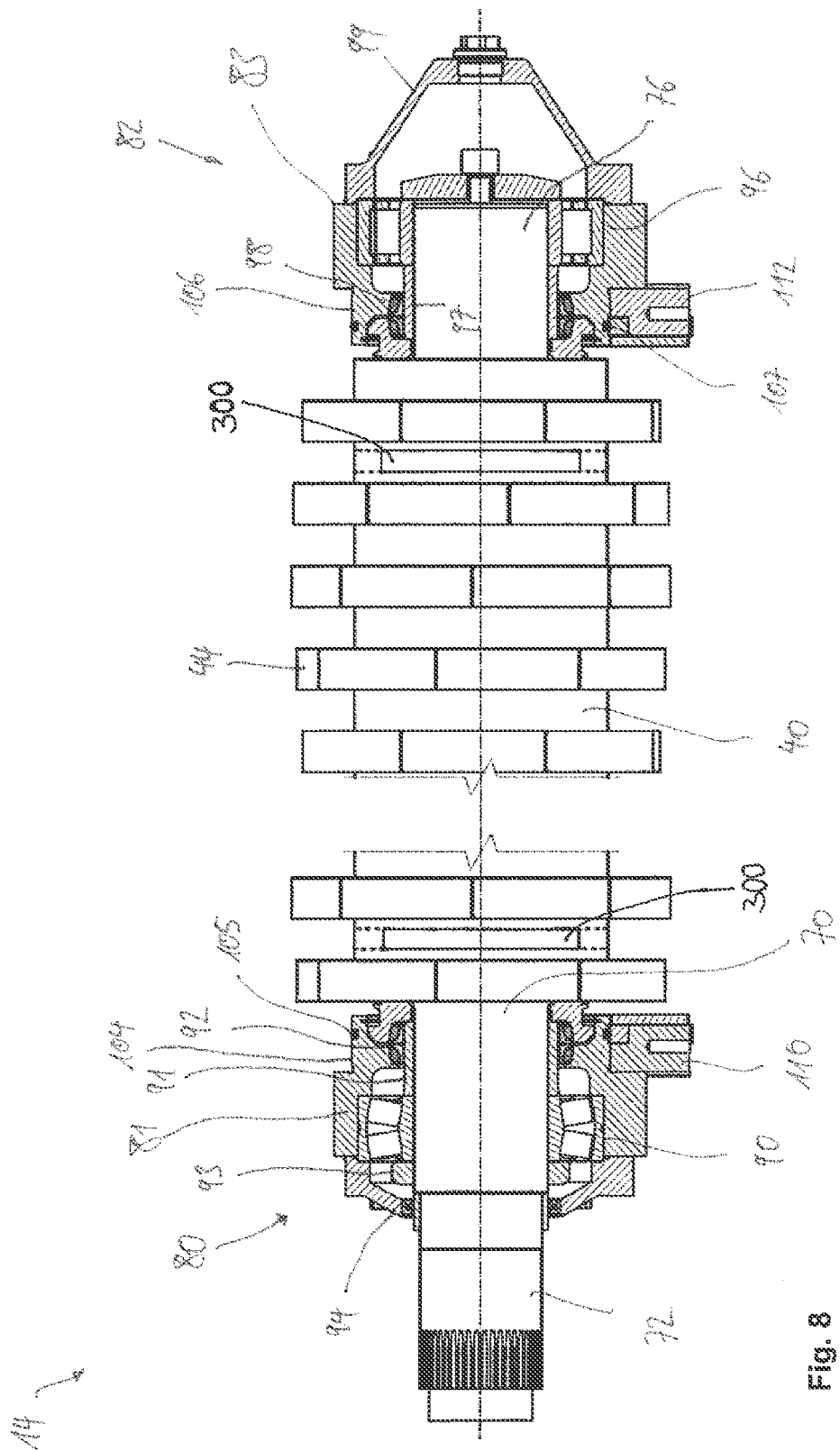
FIG. 8 is a cross section of the cutter disc unit shown in FIG. 7.
Figure 9:
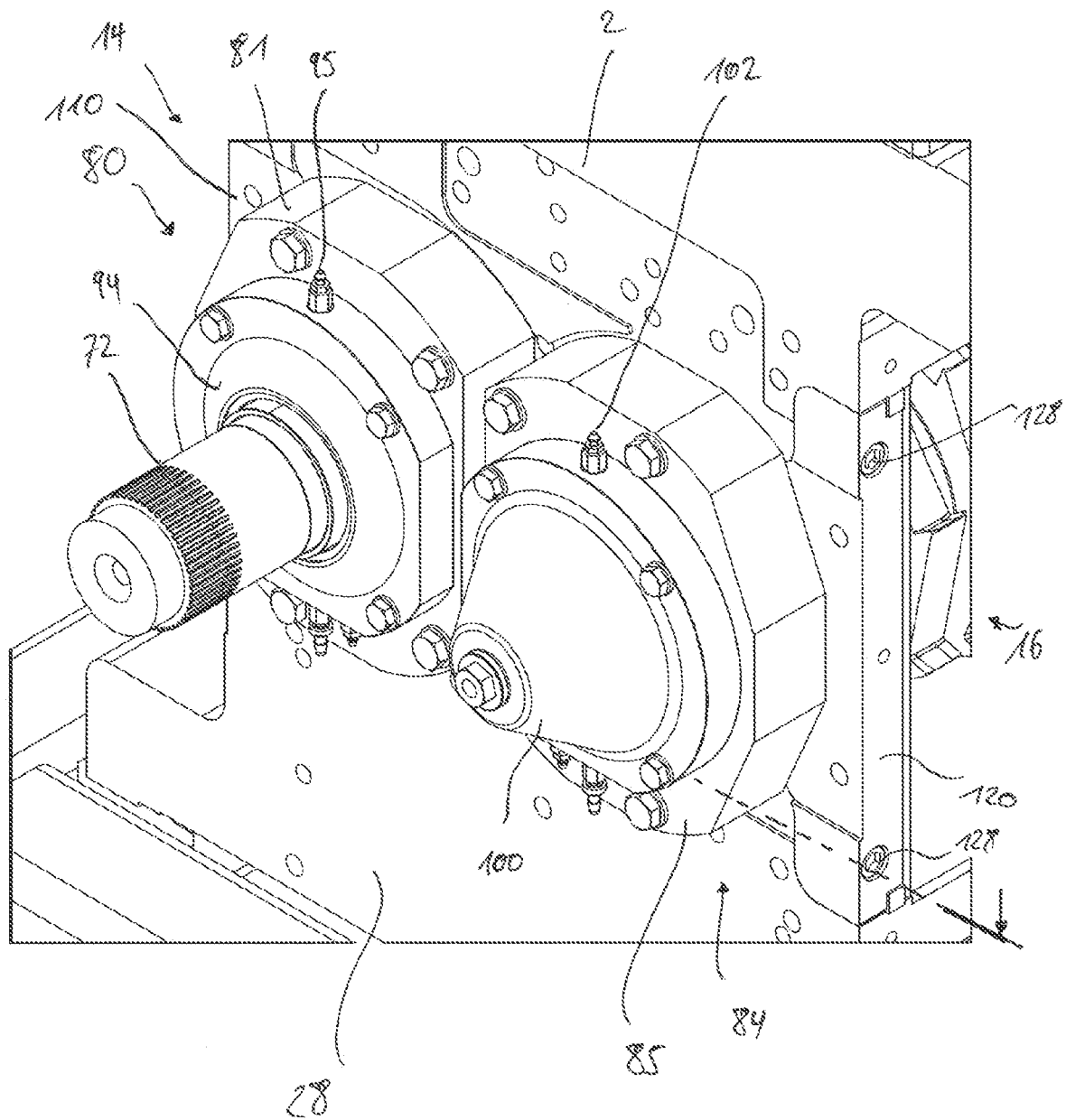
FIG. 9 is another detail from FIG. 1.

The first cutter disc unit 14 is shown separately and in perspective in FIG. 7. A cross section of this first cutter disc unit 14 is shown in FIG. 8. The section in FIG. 8 is horizontal and FIG. 8 is then a top view. Even though only the first cutter disc unit 14 is shown in FIGS. 7 and 8, it is to be understood that the second cutter disc unit 16 is of identical construction and to that extent the following description also applies to the second cutter disc unit 16.

The first cutter discs 44 are arranged on a first hub body 70 and are integrally formed therewith in the embodiment shown. Accordingly, the cutter disc block 40 is formed as a so-called monolithic cutter disc block. However, this is not mandatory and also includes embodiments in which the first cutter discs 40 are connected to the first hub body 70 in a non-positive and/or positive manner. Also shown in FIG. 8 are an optional first groove 300 and an optional second groove 300 formed on the hub body 70. The grooves 300 are indicated by dashed lines, indicating that they are optional.

With reference to FIG. 8, at the left side, the first hub body 70 extends into a first stub shaft 72 that is couplable to the first transmission 19. Referring to FIG. 8, at the right side, the cutter disc block 40 includes a second stub shaft 76. The left end of the cutter disc block 40, at which the first stub shaft 72 is arranged, is received in a first bearing unit 80 and the second stub shaft 76 is received in a second bearing unit 82. Accordingly, the second cutter disc unit 16 is also formed and has a third bearing unit 84 and a fourth bearing unit 86 (cf. FIG. 4).

The first bearing unit 80 has a first bearing housing 81, the second bearing unit 82 has a second bearing housing 83, the third bearing unit 84 has a third bearing housing 85, and the fourth bearing unit 86 has a fourth bearing housing 87. The respective first and second cutter disc blocks 40, 42 are rotatably supported within the first, second, third, and fourth bearing housings 81, 83, 85, 87. By means of the first, second, third, and fourth bearing housings 81, 83, 85, 87, the first, respectively second cutter disc units 14, 16 are attached to the shredder housing 2. With reference to FIG. 8, it can be seen that a first bearing 90 in the form of a double angular contact roller bearing in an X arrangement is provided in the first bearing housing 81. A first seal 92 is provided between the bearing housing 81, which supports an outer ring of the first bearing 90, and a first bushing 91. The first seal 92 is configured here as a contacting seal and serves to seal the cutter pulley block 44 from the bearing housing 81. The inner ring of the first bearing 90 is pressed onto the first stub shaft 72, where it is frictionally secured. In addition, a nut 93 is provided to support the inner ring. The bearing housing 81 is then closed with a first bearing cover 94. The first bearing cover 94 is screwed against the first bearing housing 81 by means of screws (cf. FIG. 9). A first lubrication port 95 is further provided in the first bearing cover 94 to allow the first bearing 90 to be lubricated.

The second bearing unit 82 has a second bearing 96, which is formed here as a roller bearing and floating bearing.

The outer bearing ring is again received in the second bearing housing 83, and the inner ring is pressed onto the second stub shaft 76. The second shaft journal 76 is detachably connected to the hub body 70, as already described above. A second, contacting seal 98 is disposed between the bearing housing 83 and a second bushing 97 frictionally engaged on the second shaft journal 76, which in turn seals the cutter block 40 from the bearing housing 82 to prevent fluid from reaching the second bearing 96. Closing the second bearing housing 82 is a second bearing cover 99, which in turn is secured to the second bearing housing 82 by screws. The second bearing unit 82 is formed similarly to the third bearing unit 85, such that the shape of the second bearing cover 99 corresponds to that of a third bearing cover 100 shown in FIG. 9. The third bearing cap 100 is provided with a third lubrication port 102 for lubricating bearings received therein. A similar lubrication port is also provided for the second bearing 96 and the fourth bearing (not shown).

A particular advantage of the present invention is that cutter disc units 14, 16 together with the first, second, third, and fourth bearing units 80, 82, 84, 86 can be removed from the shredder housing 2. In other words, while disassembly of the bearings themselves is not required within the shredder housing, this makes them much less susceptible to damage and also easier to maintain. To this end, the first and second bearing housings 81, 83 comprise first and second mounting surfaces 104, 106 which, on the one hand, can be brought into abutment against first and second mounting recesses 108, 110 (cf. FIG. 4) of the shredder housing 2 and, on the other hand, cooperate with first and second counter-holders 110, 112 so as to fix the first cutter disc unit 14 to the shredder housing 2. The first and second counter-holders 110, 112 are also shown in section in FIG. 8, since the section according to FIG. 8 is a view from above. In order to achieve a further seal here, first and second O-rings 105, 107 are also arranged in the first and second mounting surfaces 104, 106, which O-rings 105, 107 can be brought into contact against the first and second counter-holders 110, 112 on the one hand and against the first and second mounting recesses 108, 110 on the other hand, so as to seal the first and second bearing housings 81, 83 against the shredder housing 2.

The third and fourth bearing housings 84, 86, are similarly configured and can be inserted into third and fourth mounting recesses 114, 116 (cf. FIG. 4) and fixed therein with corresponding third and fourth mating retainers 118, 120. The first, second, third, and fourth mating retainers 110, 112, 118, 120 have mating retainer surfaces 122, 124 corresponding to the first and second mounting surfaces 104, 106 of the first and second bearing housings 81, 83. Similarly, the third and fourth mating retainers 118, 120 have such surfaces. Further, the first and second mating retainers 110, 112 each have mounting holes 126 that can be engaged by mating retainer screws 128 to secure the first and second mating retainers 110, 112 against the shredder housing 2. The same mounting holes 126 and counter-holder screws 128 are also provided for the third and fourth counter-holders 118, 120 (cf. FIG. 9). The counter-holder screws 128 and thus also the first and second counter-holders 110, 112 are concealed by the first maintenance hatch cover 150 when the latter is in the closed position P11. Similarly, the mating retainer screws 128 of the third and fourth mating retainers 118, 120 are concealed by the second maintenance hatch cover 52 when the latter is in the closed position P12. This prevents the counter-holders from being loosened even when the first and second maintenance hatch covers 50, 52 are in the closed positions.

Figure 6:
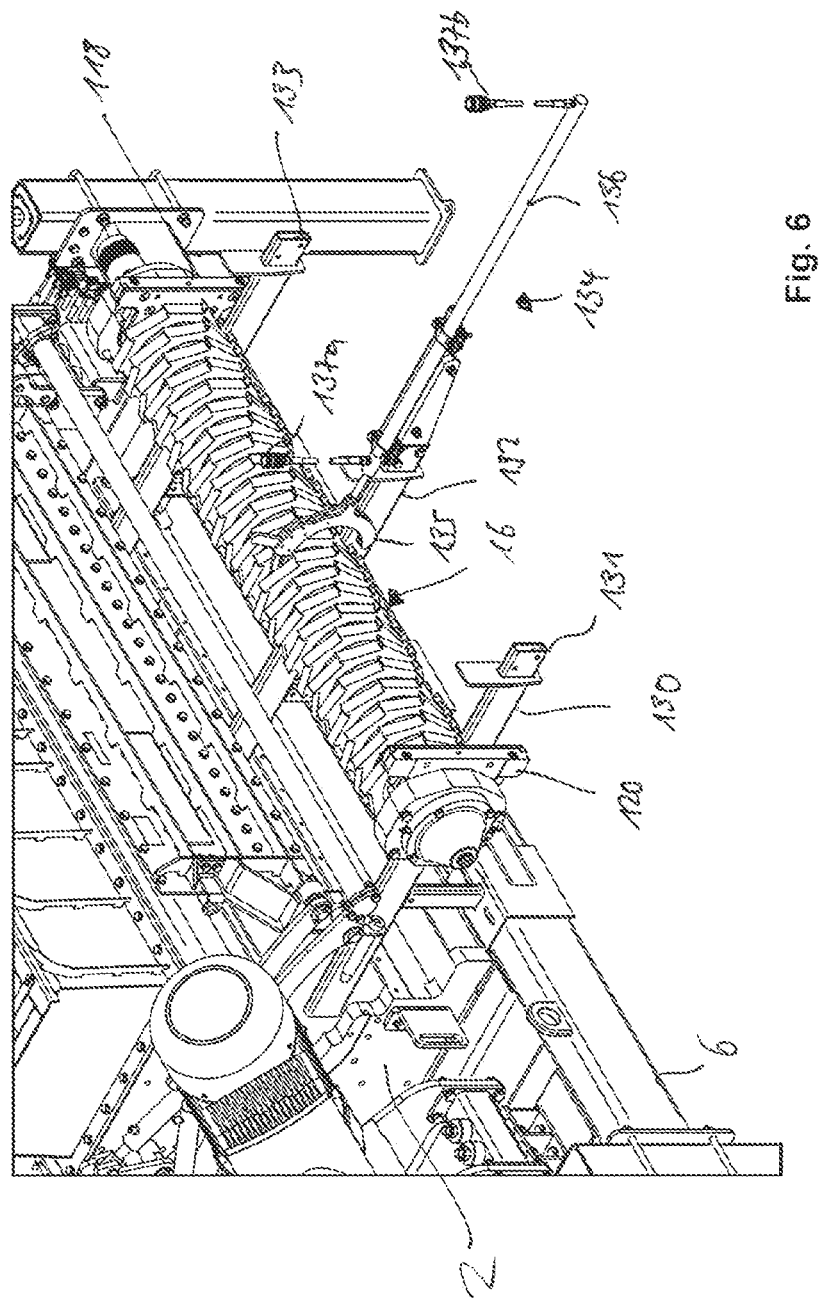
FIG. 6 is a perspective view of the two-shaft shredder from FIG. 1 with the maintenance hatch cover open and the cutter disc unit in the removed state.

Consequently, to remove the first and second cutter disc units 14, 16 from the shredder housing 2, the first and second maintenance hatch covers 50, 52 must first be moved to the release position P21, P22. Subsequently, the first and second counter-holders 110, 112, and third and fourth counter-holders 118, 120, respectively, must be released. Prior to this, a maintenance bracket 130 is preferably attached to the machine frame 6, as shown in FIG. 6, which prevents the corresponding cutter disc unit (in FIG. 6, the second cutter disc unit 16) from falling down after the third and fourth counter holders 118, 120 have been released. The maintenance bracket 130 is supported on the machine frame 6 and in this embodiment example has first, second, and third supports 131, 132, 133, with an optional gripper 134 provided on the second support 132. In other embodiment examples, only two carriers may be provided, or four or more carriers may be provided. The gripper 134 has a claw 135 that can circumferentially grip the cutter disc assembly 16. A pull rod 136 with handles 137a, 137b is provided on the claw 135, by means of which the claw 135 can be guided to the cutter disc unit 16. As long as the cutter disc unit 16 is still arranged within the shredder housing 2, it should be gripped by means of the claw 135. It can then be pulled out of the shredder housing 2 via the pull rod 136, resting on the first, second, and third struts 131, 132, 133. The cutter disc block 40 may be provided with the first groove 300, as shown in FIG. 8. The width of the grooves 300 is preferably slightly wider than the width of the struts 131, 132, 133. The struts 131, 132, 133 are positioned below the cutter disc assembly 16 such that grooves 300 and struts 131, 132, 133 can interlock. The grooves 300 allow the cutter disc unit 16 to be positioned axially above the supports 131, 132, 133. The cutter disc unit 16 can be rolled out of the shredder housing 2 along the supports 131, 132, 133, for example, manually, with the cutter disc unit 16 resting on the first, second and/or third supports 131, 132, 133 and being guided over the grooves 300, so that the axial positioning of the cutter disc unit 16 is maintained even during rolling out. This has the advantage that the position of the bearing housings 81, 83 is maintained in the axial direction with respect to the axis of rotation or is fixed by the grooves 300. From here, the cutter disc unit 16 can then be transported, for example, with the aid of a crane. Preferably, the first and second cutter disc units 14, 16 are inserted back into the shredder housing 2 in an analogous manner. This enables simple and safe maintenance on the one hand and minimizes the risk of injury on the other.

Figure 10:
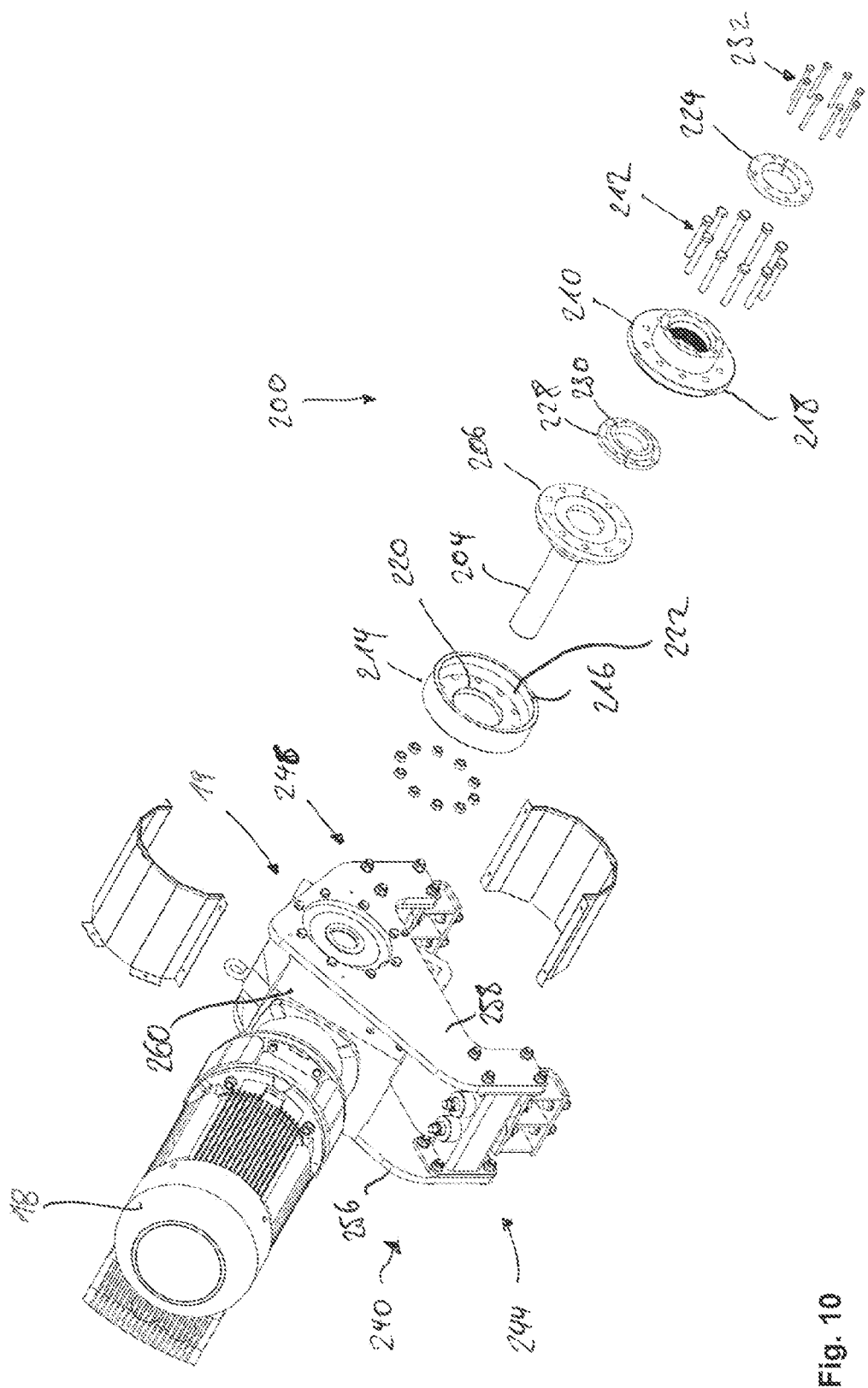
FIG. 10 is a perspective exploded view of a coupling.
Figure 11:
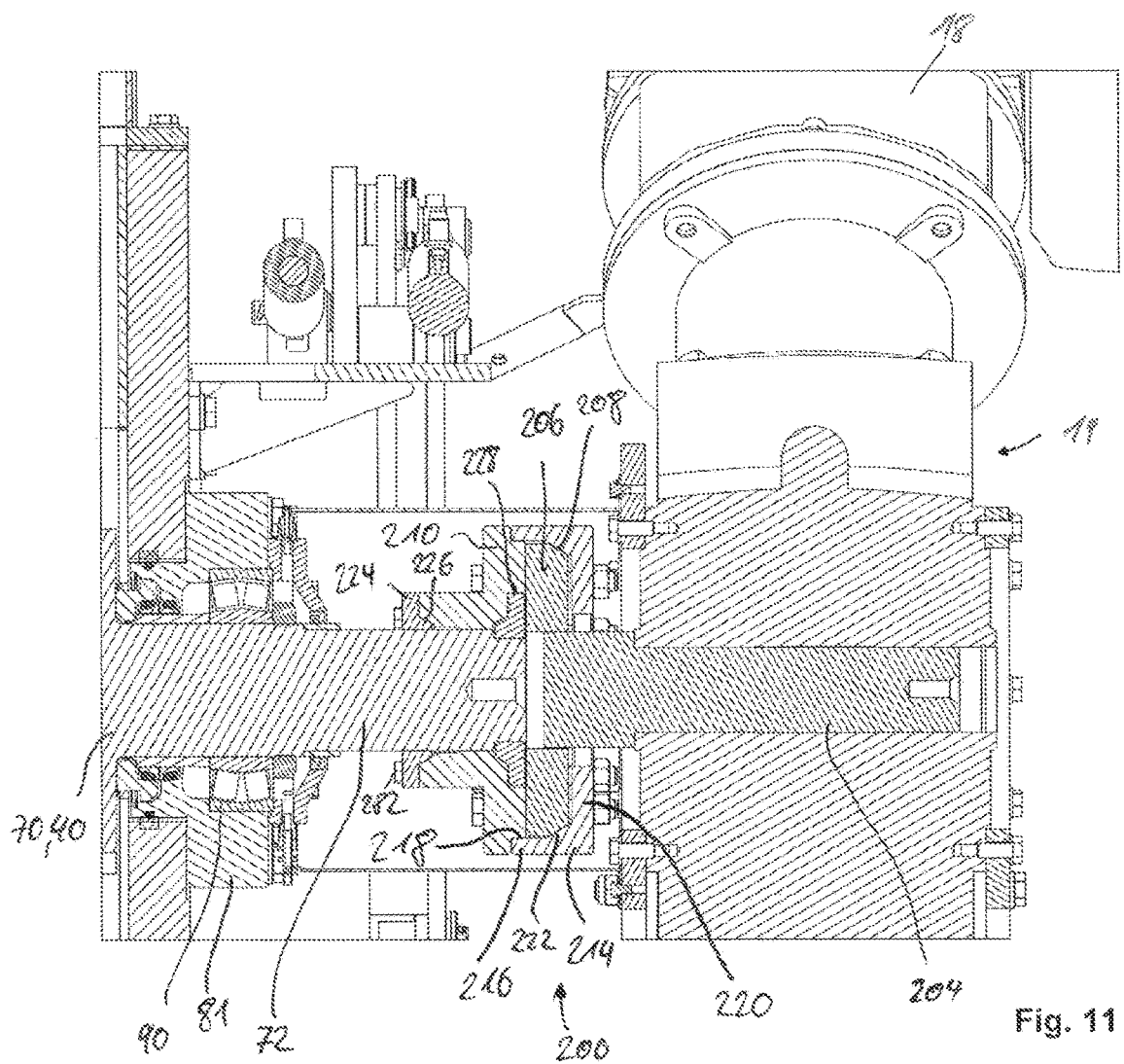
FIG. 11 is a section through the assembled coupling of FIG. 10.

The first and second cutter disc blocks 40, 42 of the first and second cutter disc units 14, 16 are connected to the first and second drive motors 18, 20 via first and second couplings 200, 202, as illustrated in FIG. 10 and FIG. 11. Of these couplings 200, 202, only one is described below, namely the first coupling 200 by way of example. Identical designs preferably apply to the second coupling 202, but it may also be of a different or similar design.

In the embodiment shown, the first and second cutter disc blocks 40, 42 are connected to the first and second drive motors 18, 20 via the first and second gearboxes 19, 21, even though gearboxes are not essential and the drive motors 18, 20 could also be coupled directly to the cutter disc blocks 40,42.

The first gearbox 19 has a first output shaft 204, which is provided with a first clutch disc 206 at its distal end. The first clutch disc 206 has a first cone portion 208 (see FIG. 11), which is formed here as a male cone. A second clutch disc 210 is non-rotatably seated on the shaft-journal 72. Both the first clutch disc 206 and the second clutch disc 210 are provided with a plurality of through holes, so that they can be clamped against each other by means of clutch screws 212. A centering cup 214 is provided to center the first clutch disc 206 against the second clutch disc 210, thereby centering the output shaft 204 against the shaft journal 72. The centering cup 214 also has through holes so that it can be clamped against the first and second clutch discs 206, 210, preferably by means of the clutch screws 212. The centering cup 214 has its collar 216 seated on a radial centering surface 218 of the second clutch disc 210 and its base 220 engaging behind the first clutch disc 206. A second cone portion 222 is formed on the centering cup 214 between the collar 216 and the base 220 and corresponds with the first cone portion 208 and can cooperate therewith for centering. Thus, when the coupling screws 212 are tightened, the second cone portion 222 is pressed against the first cone portion 208 and thus the first coupling disc 206 is centered on the centering cup 214.

In order to additionally center the second clutch disc 210 on the shaft journal 72, a first conical ring 224 is provided in this embodiment, which extends with a first conical projection 226 between the first clutch disc 210 and the shaft journal 72, as well as a second conical ring 228, which extends with a second conical projection 230 between the first clutch disc 210 and the shaft journal 72, and is arranged opposite the first conical ring 224. The two cone rings 224, 228 are braced against each other by eyebolts 232. In this way, the second clutch disc 210 is centered on the shaft journal 72. Furthermore, the output shaft 204 is also aligned in this way with respect to the shaft journal 72. Thus, both angular errors and radial misalignment are compensated.

Figure 12:
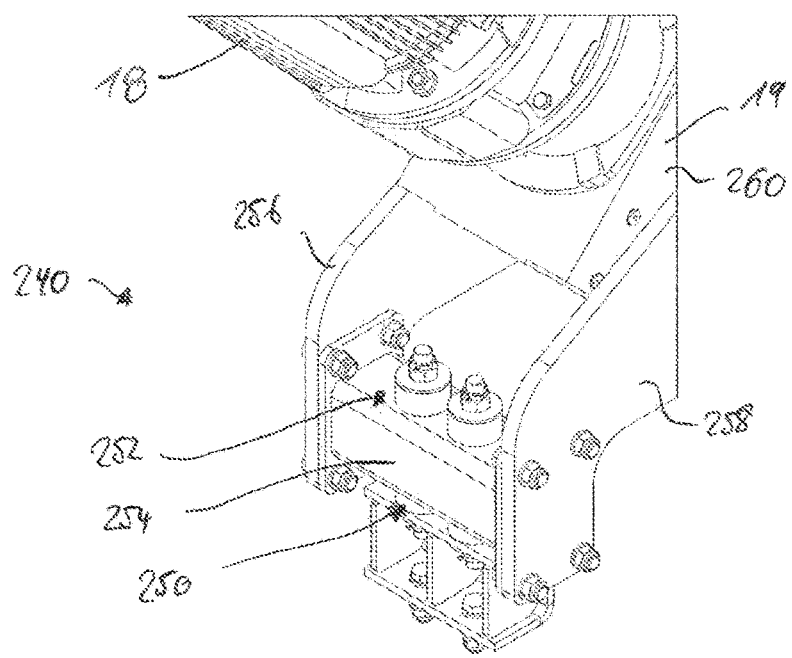
FIG. 12 is a torque support of a drive motor.

FIG. 10 and FIG. 12 now illustrate a drive bearing of the drive motor in detail. The first drive motor 18 is supported on the machine frame 6 via a first drive bearing 240 (cf. FIG. 1), and the second drive motor 20 is supported on the machine frame 6 via a second drive bearing 242. Only the first drive bearing 240 is explained below, although identical explanations preferably also apply to the second drive bearing 242.

The first drive bearing 240 includes a first torque support 244 and a second torque support 246. The first drive bearing 240 is designed as a floating bearing and does not center the first drive motor 18 and the first gearbox 19 relative to the first cutter block 40; this is achieved via the first coupling 200 as described above. In operation, the first and second torque supports 244, 246 preferably serve solely to support torques. They may also be configured to partially support weight forces in order to partially relieve the load on the bearings of the cutter disc blocks. When the first and second couplings 200, 202 are open, the first and second torque supports 244, 246 fully absorb the weight force of the first and second drive motors 18, 20, and, if applicable, of the first and second gears 19, 21. Therefore, they will slightly move down a little bit.

Here, the first torque support 244 includes a first damper arrangement 250 to support torques in a first direction of rotation and a second damper arrangement 252 to support torques in a second opposite direction of rotation. The second torque support 246 includes first and second damper arrangements, which are similar to each other (not shown, see FIG. 10). Each damper arrangement 250, 252 here also comprises two rubbers attached to a cross member 254. The cross member 254 is in turn attached via first and second support plates 256, 258 to a first gear housing 260, which in turn also supports the first drive motor 18.

Figure 13:
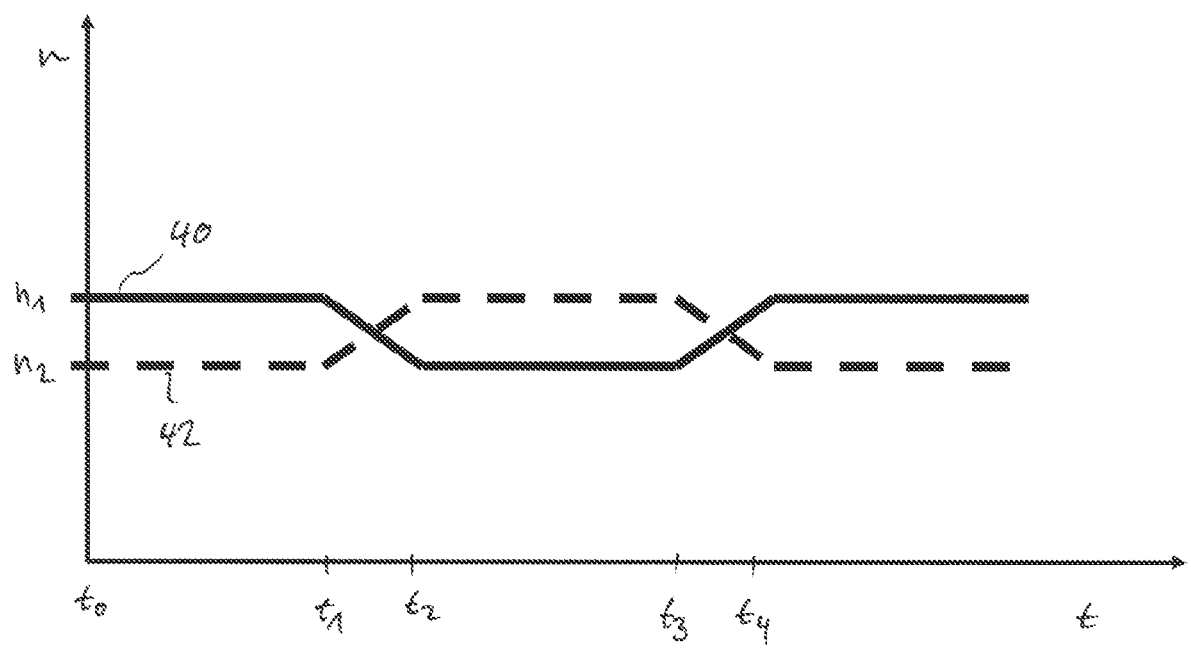
FIG. 13 is a schematic representation of a drive control of the two-shaft shredder.

The first and second drive motors 18, 20 can be independently controlled by the electronic control unit 22. This allows the two-shaft shredder 1 to be operated in two or more modes of operation. For example, in a first mode of operation, the first and second cutter disc blocks 40, 42 are controlled to rotate in the same direction, at substantially identical speeds. Then, in a second mode of operation, the drive motors 18, 20 are controlled by the control unit 22 to drive the first and second cutter disc blocks 40, 42 at different speeds and/or in the same direction of rotation. FIG. 13 illustrates such a scenario. The horizontal axis is the time axis, and speed n is identified on the vertical axis. At time t0, the first cutter block 40 is driven at a speed n1 that is higher than the speed n2 at which the second cutter block 42 is driven. At a time t1, the electronic control unit 22 then starts to reverse and accelerates the second cutter disc block 42 until it reaches the first speed n1 at the time t2. At the same time, the first cutter disc block 40 is slowed down at time t1 until it has the lower speed n2 at time t2. After a predetermined period of time, which lies between the second time t2 and a third time t3, the two-shaft shredder 1 continues to operate. At time t3, the first cutter disc block 40 is then again accelerated, starting from speed n2 to speed n1, which the latter reaches at time t4. At the same time, the second cutter disc block 42 is decelerated to reach the second speed n2 again at time t4. Additional similar periods may follow. This operating mode has the advantage that there is a relative movement between the first and second cutter disc blocks 40, 42, so that they "scratch each other free," i.e., any elements adhering in gaps between individual cutter discs are conveyed out.

Figure 14:
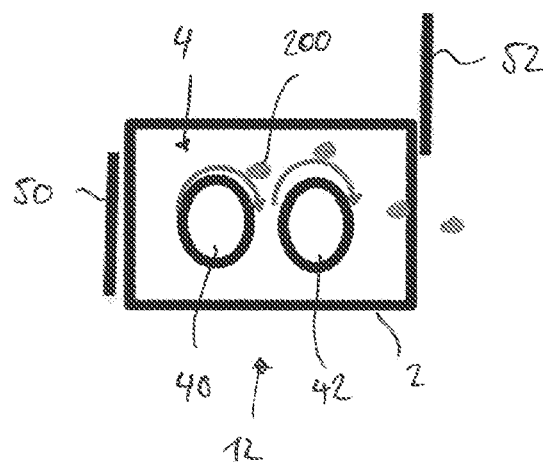
FIG. 14 is another schematic representation of a drive control of the two-shaft shredder.

FIG. 14 shows a further operating mode in which foreign bodies 200 are conveyed out of the comminution chamber 4. If foreign bodies 200, which cannot be crushed despite the grate 11 (cf. FIG. 1), get into the crushing chamber 4, they cannot reach the outlet opening 12 because they cannot be crushed and are retained on the other side by the rakes 66, 68. In order to now automatically convey these foreign bodies out of the size reduction chamber, it is preferred to open one of the maintenance hatch covers 50, 52, in FIG. 11 the second maintenance hatch cover 52. Subsequently, both cutter disc blocks 40, 42 are rotated in the direction of the opened maintenance hatch cover, in this case in a clockwise direction of rotation. In this way, the foreign bodies 200 are moved by the cutter disc blocks 40, 42 in the direction of the opened maintenance hatch cover 52 and thus fall out of the shredder housing 2.

In such an operating mode, it is important to take appropriate safety measures for operating personnel to prevent injury to the then laterally exposed cutter block. For example, it may be stipulated that such operation may only be carried out in a closed room.

Other such operating modes are conceivable and preferred, and have been described above. It is preferred to store such operating modes in the electronic control unit 22, preferably on a memory provided there. For this purpose, the electronic control unit 22 preferably has an operating panel 202 (cf. FIG. 1) via which an operator can operate the two-shaft shredder 1.

The invention claimed is:
1. A two-shaft shredder for shredding solids or solids in liquids, comprising:
a shredder housing defining an internal shredding chamber;

an inlet opening in the shredder housing for supplying solids into the shredding chamber;

an outlet opening in the shredder housing substantially opposite the inlet opening for discharging shredded solids from the shredding chamber;

a first cutter disc unit comprising a first cutter disc block having a plurality of first cutter discs arranged on a first hub body such that there is a space between each two adjacent first cutter discs;

a second cutter disc unit comprising a second cutter disc block having a plurality of second cutter discs arranged on a second hub body such that there is a space between each two adjacent second cutter discs;

wherein the first and second cutter disc blocks are axially offset from each other with their axes of rotation such that at least some of the first cutter discs each engage a space between two adjacent second cutter discs and some of the second cutter discs each engage a space between two adjacent first cutter discs;

wherein the first cutter disc unit has at a first axial end a first bearing unit with a first bearing housing, and at a second axial end a second bearing unit with a second bearing housing, in which the first cutter disc block is mounted rotatably about a first axis of rotation;

wherein the second cutter disc unit comprises at a first axial end a third bearing unit with a third bearing housing, and at a second axial end a fourth bearing unit with a fourth bearing housing, in which the second cutter disc block is rotatably mounted about a second axis of rotation; and wherein the shredder housing has a first maintenance hatch cover which can assume a release position and a closed position and, in the release position, permits removal of the first cutter disc unit together with the first and second bearing units and, in the closed position, prevents removal of the first cutter disc unit together with the first and second bearing units.

2. The two-shaft shredder according to claim 1, wherein the shredder housing comprises a second maintenance hatch cover which can assume a release position and a closed position and, in the release position, permits removal of only the second cutter disc unit together with the third and fourth bearing units.

3. The two-shaft shredder of claim 1, wherein the bearing units comprise seals so as to seal the bearings of the bearing units against the cutter disc blocks.

4. The two-shaft shredder according to claim 1, wherein the respective bearing housings of the bearing units can be fixed against rotation on the shredder housing in the assembled state.

5. The two-shaft shredder according to claim 1, wherein the shredder housing comprises an inlet side having the inlet opening, an outlet side having the outlet opening, and first and second end sides arranged perpendicular to the first and second axes of rotation, and first and second lateral sides, wherein the first maintenance hatch cover is arranged at the first lateral side.

6. The two-shaft shredder according to claim 1, wherein the first cutter disc unit is removable from the shredder housing in a first removal direction which is transverse to the first axis of rotation and parallel to a plane defined by the first and second axes of rotation.

7. The two-shaft shredder according to claim 1, wherein the first cutter disc unit is positively fixed to the shredder housing by means of first and second counter holders.

8. The two-shaft shredder of claim 7, wherein the first and second counter holders are concealed by the first maintenance hatch cover when the first maintenance hatch cover is in the closed position and are accessible when the first maintenance hatch cover is in the released position.

9. The two-shaft shredder according to claim 1, comprising a first parallel kinematic system for moving the first maintenance hatch cover from the closed position to the release position.

10. The two-shaft shredder according to claim 9, comprising a first lifting means engaging the first parallel kinematics for moving the first maintenance hatch cover from the closed position to the release position.

11. The two-shaft shredder according to claim 1, wherein the first and second cutter disc blocks are provided with at least one first groove into which a carrier can engage for guiding.

12. The two-shaft shredder according to claim 1, further comprising:
a first drive motor, which preferably can drive the first cutter disc block via a first gear;
a second drive motor, which can preferably drive the second cutter block via a second gear; and
an electronic control unit for controlling the two drive motors.

13. The two-shaft shredder of claim 12, further comprising:
a first coupling between the first cutter block and the first drive motor; and
a second coupling between the second cutter block and the second drive motor,
said first coupling having a first centering means for centering said first drive motor relative to said first cutter block, and said second coupling having a second centering means for centering said second drive motor relative to said second cutter block.

14. The two-shaft shredder of claim 13, wherein the first and second centering means each include corresponding cone portions that clampingly engage one another.

15. The two-shaft shredder according to claim 12, wherein the first and second drive motors are floating.

16. A two-shaft shredder according to claim 12, wherein the electronic control unit is arranged to control the drive motors in at least a first operating mode and in a second operating mode different from the first operating mode.

17. The two-shaft shredder according to claim 16, wherein:
the electronic control unit is arranged to control the first and second drive motors in the first operating mode in such a way that the first and second cutter disc blocks are driven in opposite directions at substantially identical speeds; and
the control unit is arranged to control the first and second drive motors in the second operating mode in such a way that the first and second cutter disc blocks are driven at different speeds and/or in the same direction of rotation.

18. The two-shaft shredder according to claim 12, wherein the electronic control unit is arranged to control the drive motors such that the cutter disc blocks have a low differential speed with respect to each other.

19. The two-shaft shredder according to claim 12, wherein the electronic control unit is arranged to control the drive motors such that the cutter disc blocks have alternating speeds.

20. The two-shaft shredder according to claim 12, wherein the electronic control unit is arranged to control the drive motors such that only one of the cutter disc blocks rotates while the other is stationary.

21. The two-shaft shredder according to claim 20, wherein the rotating cutter disc block rotates against a shredding direction.

22. The two-shaft shredder according to claim 12, wherein the gears are bevel gears.

\* \* \* \* \*